United States Patent
Zhijian

(10) Patent No.: US 12,381,412 B2
(45) Date of Patent: Aug. 5, 2025

(54) WIRELESS CHARGING SYSTEM FOR BACKPACK OR OTHER LUGGAGE

(71) Applicant: Li Zhijian, Fujian (CN)

(72) Inventor: Li Zhijian, Fujian (CN)

( * ) Notice: Subject to any disclaimer, the term of this patent is extended or adjusted under 35 U.S.C. 154(b) by 0 days.

(21) Appl. No.: 18/625,102

(22) Filed: Apr. 2, 2024

(65) Prior Publication Data
US 2024/0250553 A1   Jul. 25, 2024

Related U.S. Application Data

(60) Continuation-in-part of application No. 17/903,078, filed on Sep. 6, 2022, now Pat. No. 12,057,733, which is a division of application No. 17/151,756, filed on Jan. 19, 2021, now Pat. No. 11,735,949, which is a continuation-in-part of application No. 16/838,059, filed on Apr. 2, 2020, now Pat. No. 10,931,138, which is a continuation-in-part of application No. 16/388,994, filed on Apr. 19, 2019, now Pat. No. 10,931,137, which is a continuation of application No. 14/836,104, filed on Aug. 26, 2015, now Pat. No. 10,574,071, said application No. 17/151,756 is a continuation-in-part of application No. 16/388,994, filed on Apr. 19, 2019, now Pat. No. 10,931,137,
(Continued)

(30) Foreign Application Priority Data

Nov. 18, 2014   (CN) .......................... 201420692148.1
Aug. 20, 2015   (CN) .......................... 201520737260.7

(51) Int. Cl.
*H02J 7/34* (2006.01)
*H02J 7/00* (2006.01)

(52) U.S. Cl.
CPC ............ *H02J 7/342* (2020.01); *H02J 7/0042* (2013.01); *H02J 7/00* (2013.01)

(58) Field of Classification Search
CPC ............. H02J 7/342; H02J 7/0042; H02J 7/00
USPC ........................................................ 320/103
See application file for complete search history.

(56) References Cited

U.S. PATENT DOCUMENTS 6,816,760 B1   11/2004   Namaky
6,870,089 B1   3/2005   Gray
(Continued)

FOREIGN PATENT DOCUMENTS

CN   206659368 U   11/2017
CN   208610074 U   3/2019
(Continued)

*Primary Examiner* — Nathaniel R Pelton
(74) *Attorney, Agent, or Firm* — Lippes Mathias LLP

(57) ABSTRACT

A wireless charging cable system includes a body. A cable includes a wireless charging end including a wireless charger and an input operative end, the cable at least partially located between body inner surfaces. A raised portion is located on an outer surface. A power storage space is provided for a battery. A tunnel is located between the inner surfaces for the cable to extend from the raised portion to the power storage space. The raised portion includes at least one holding component to secure a mobile device firmly to the raised portion. The wireless charger is fixed by a fixing component to at least one of the inner surfaces of the body to secure the wireless charger in an operative position adjacent the raised portion to improve wireless charge coupling.

18 Claims, 44 Drawing Sheets

Related U.S. Application Data which is a continuation of application No. 14/836,104, filed on Aug. 26, 2015, now Pat. No. 10,574,071, said application No. 17/151,756 is a continuation-in-part of application No. 16/738,208, filed on Jan. 9, 2020, now abandoned, which is a continuation of application No. 16/007,055, filed on Jun. 13, 2018, now abandoned, which is a continuation of application No. 14/930,719, filed on Nov. 3, 2015, now abandoned, said application No. 17/151,756 is a continuation-in-part of application No. 17/151,741, filed on Jan. 19, 2021, now Pat. No. 11,101,683, said application No. 17/903,078 is a continuation of application No. 17/558,674, filed on Dec. 22, 2021, now Pat. No. 11,601,009.

(56) References Cited

U.S. PATENT DOCUMENTS

| | | | |
|---|---|---|---|
| 7,914,306 B1 | 3/2011 | Blackwell | |
| 7,948,208 B2 * | 5/2011 | Partovi | H02J 7/0013 320/108 |
| 8,593,108 B2 | 11/2013 | Ferber | |
| 9,144,281 B2 | 9/2015 | Cross | |
| 9,287,722 B2 | 3/2016 | Williams | |
| 9,419,456 B2 | 8/2016 | Pickens | |
| 9,722,439 B2 | 8/2017 | Williams | |
| 9,800,075 B2 | 10/2017 | McLean | |
| 9,865,153 B2 | 1/2018 | Zhijian | |
| 10,130,163 B2 | 11/2018 | Zhijian | |
| 10,547,036 B1 | 1/2020 | Ashley | |
| 10,992,075 B2 | 4/2021 | Chan | |
| 11,202,490 B1 | 12/2021 | Lloyd | |
| 2002/0198031 A1 | 12/2002 | Holmes | |
| 2004/0129749 A1 | 7/2004 | Hassett | |
| 2005/0116684 A1 | 6/2005 | Kim | |
| 2005/0140331 A1 * | 6/2005 | McQuade | A45C 15/00 320/101 |
| 2006/0273757 A1 | 12/2006 | Naguib | |
| 2007/0215663 A1 | 9/2007 | Chongson | |
| 2007/0297149 A1 | 12/2007 | Richardson | |
| 2008/0011799 A1 | 1/2008 | Chang | |
| 2008/0125164 A1 | 5/2008 | Singh | |
| 2008/0210728 A1 | 9/2008 | Bihn | |
| 2008/0283114 A1 | 11/2008 | Gray | |
| 2009/0006677 A1 | 1/2009 | Rofougaran | |
| 2009/0061926 A1 | 3/2009 | Lee | |
| 2009/0224722 A1 | 9/2009 | Causey | |
| 2009/0276089 A1 | 11/2009 | Bartholomew | |
| 2011/0110514 A1 | 5/2011 | Gustavsson | |
| 2012/0262116 A1 | 10/2012 | Ferber | |
| 2012/0262117 A1 | 10/2012 | Ferber | |
| 2012/0286718 A1 | 11/2012 | Richards | |
| 2012/0299528 A1 | 11/2012 | Scarmozzino | |
| 2013/0026726 A1 | 1/2013 | Thomas | |
| 2013/0162389 A1 | 6/2013 | Crucs | |
| 2013/0214931 A1 | 8/2013 | Chia | |
| 2013/0249673 A1 | 9/2013 | Ferrari | |
| 2013/0324041 A1 * | 12/2013 | Pagani | H02J 50/70 455/41.1 |
| 2014/0002239 A1 | 1/2014 | Rayner | |
| 2014/0061273 A1 * | 3/2014 | Bullivant | A45F 3/04 224/576 |
| 2014/0171132 A1 | 6/2014 | Ziemianska | |
| 2014/0171157 A1 * | 6/2014 | Ho | H02J 50/70 455/573 |
| 2014/0327401 A1 | 11/2014 | Pickens | |
| 2015/0247831 A1 | 9/2015 | Lewis | |
| 2015/0296644 A1 | 10/2015 | Chin | |
| 2015/0318716 A1 * | 11/2015 | Pickens | H02J 7/0042 320/110 |
| 2015/0326044 A1 * | 11/2015 | Ashley | H02J 7/342 320/103 |
| 2015/0351263 A1 | 12/2015 | DeSanctis | |
| 2015/0359127 A1 | 12/2015 | Daoura | |
| 2015/0366333 A1 * | 12/2015 | Zhijian | A45C 15/00 224/576 |
| 2016/0141904 A1 | 5/2016 | Zhijian | |
| 2016/0190817 A1 * | 6/2016 | Hartelt | H02J 7/0044 307/104 |
| 2016/0314681 A1 * | 10/2016 | Zhijian | H04W 4/02 |
| 2017/0119121 A1 | 5/2017 | Munoz | |
| 2018/0152037 A1 | 5/2018 | Yu | |
| 2018/0198295 A1 | 7/2018 | Warney | |
| 2020/0000207 A1 | 1/2020 | Liu | |
| 2021/0162221 A1 * | 6/2021 | Ning | H02J 50/005 |
| 2021/0169203 A1 | 6/2021 | Woolery | |
| 2022/0158488 A1 * | 5/2022 | Bourque | A41D 1/002 |

FOREIGN PATENT DOCUMENTS

| | | |
|---|---|---|
| CN | 211017673 U | 7/2020 |
| CN | 201730189762.5 | 9/2021 |
| KR | 101390704 | 4/2014 |
| KR | 2014132850 A | 11/2014 |

* cited by examiner

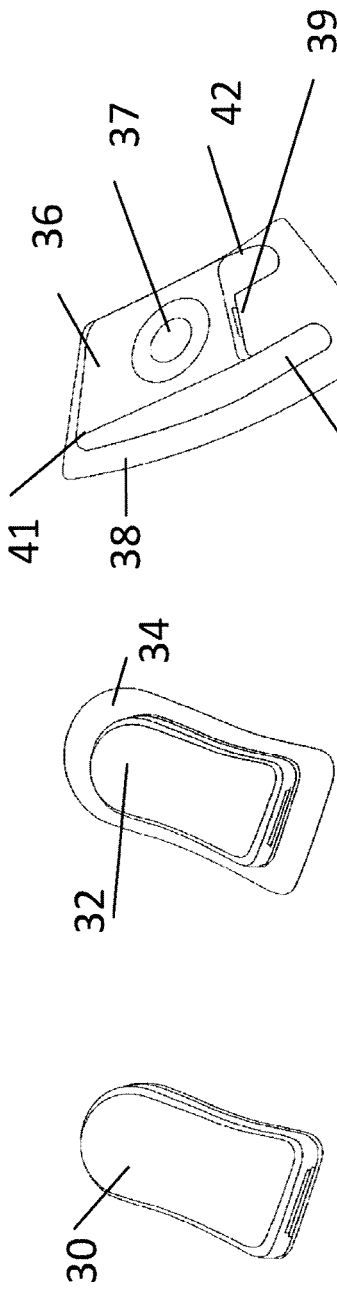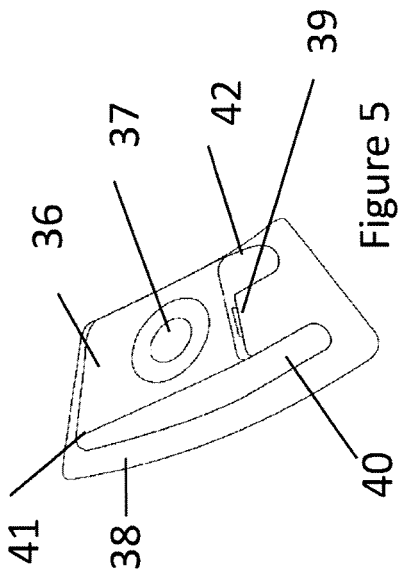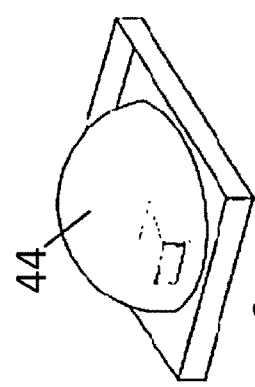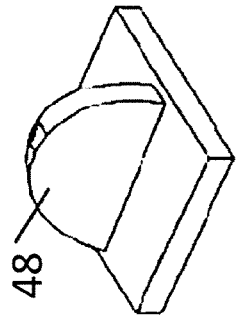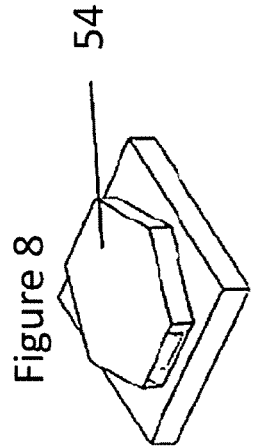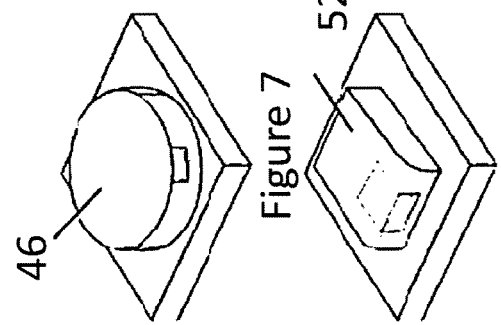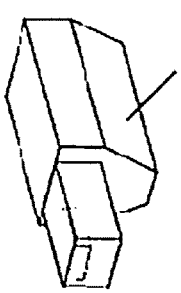

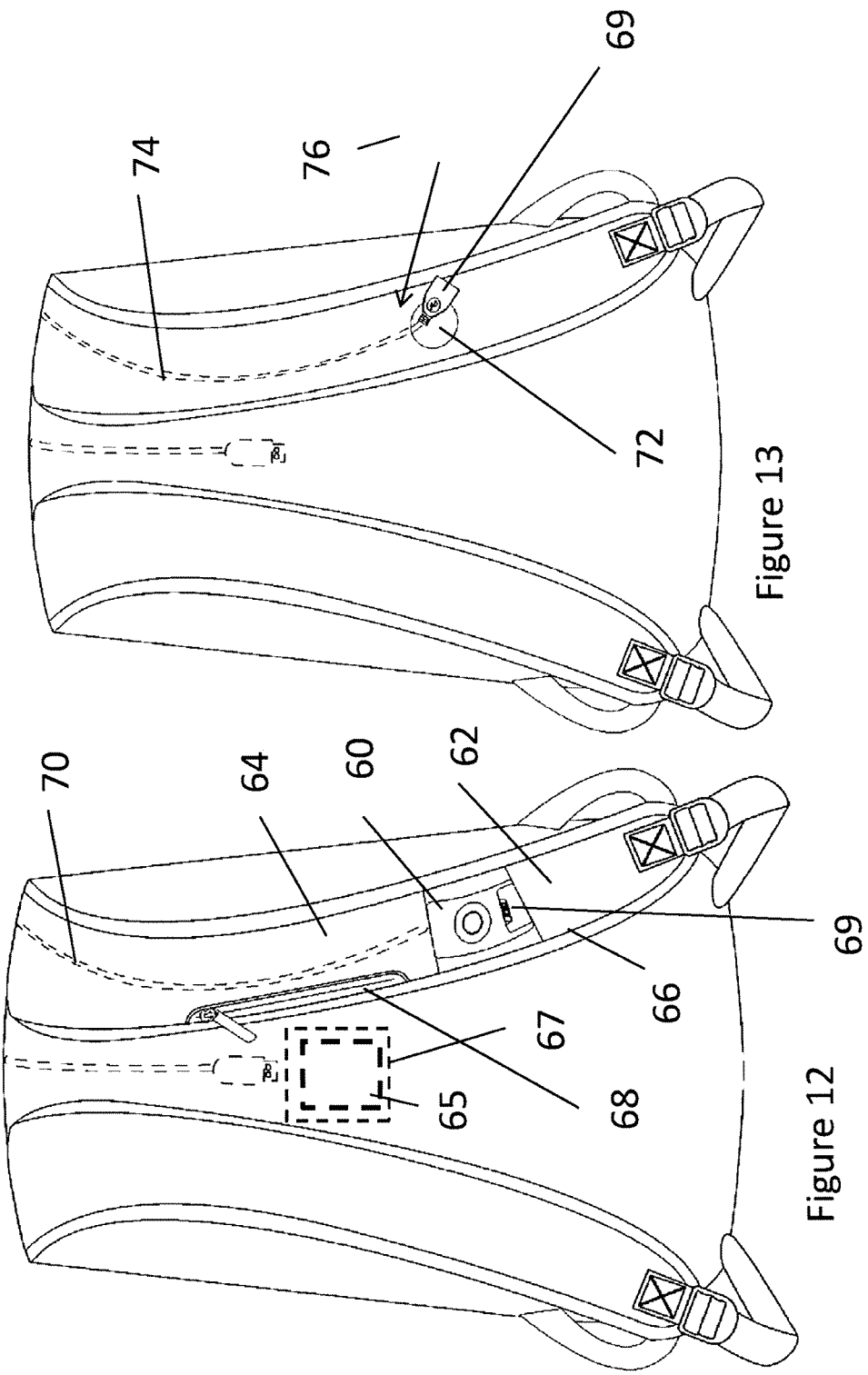

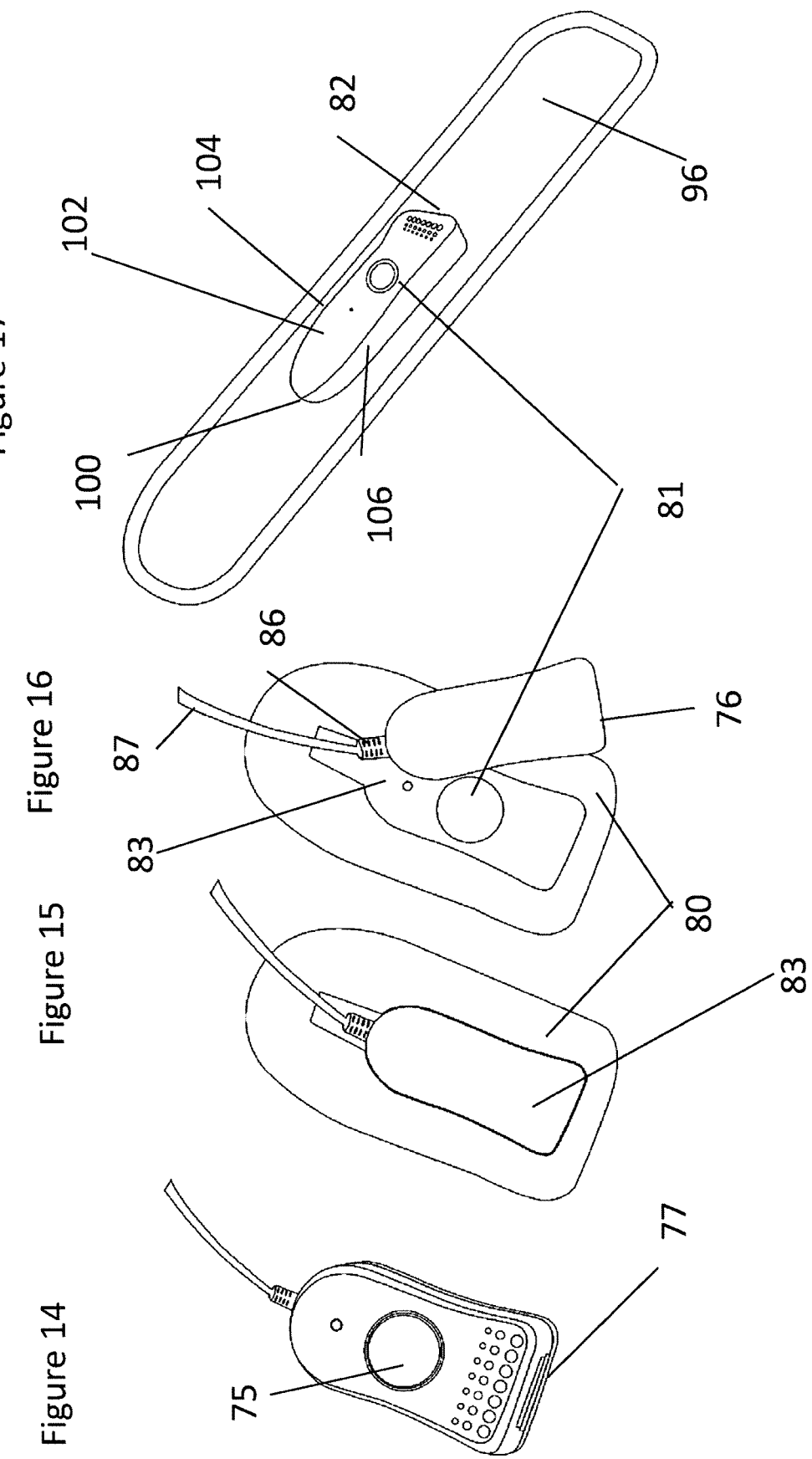

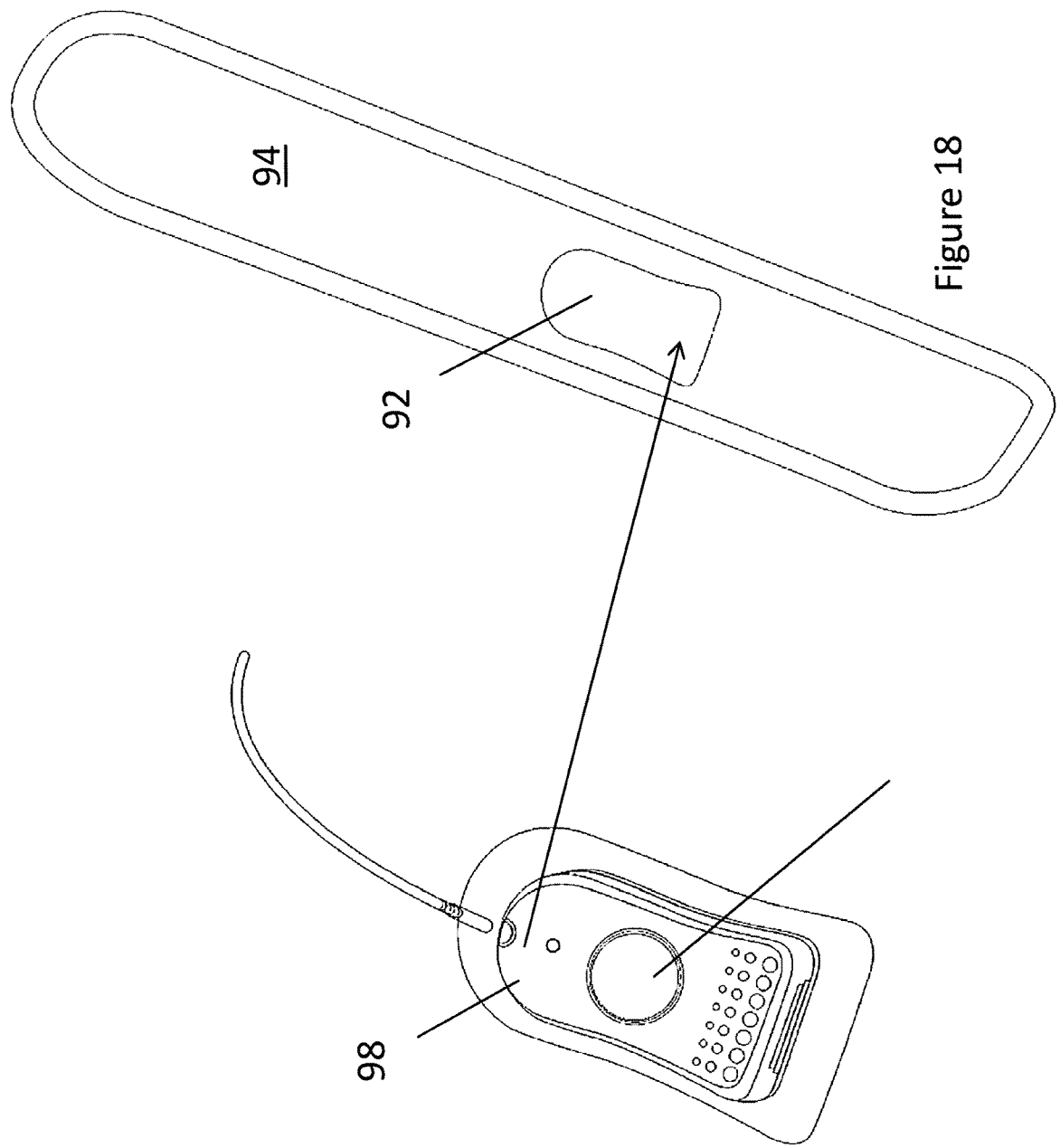

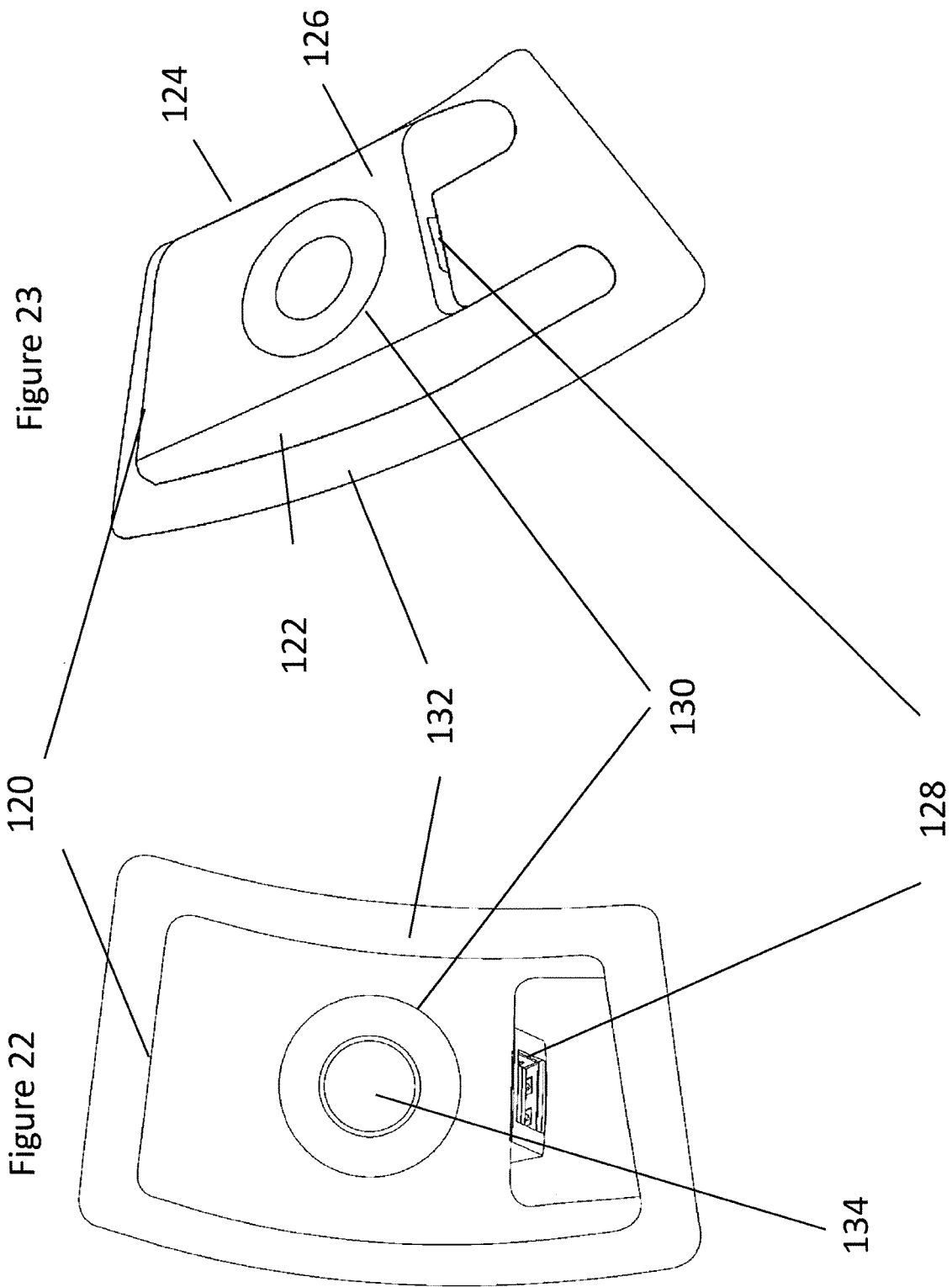

154

152

150

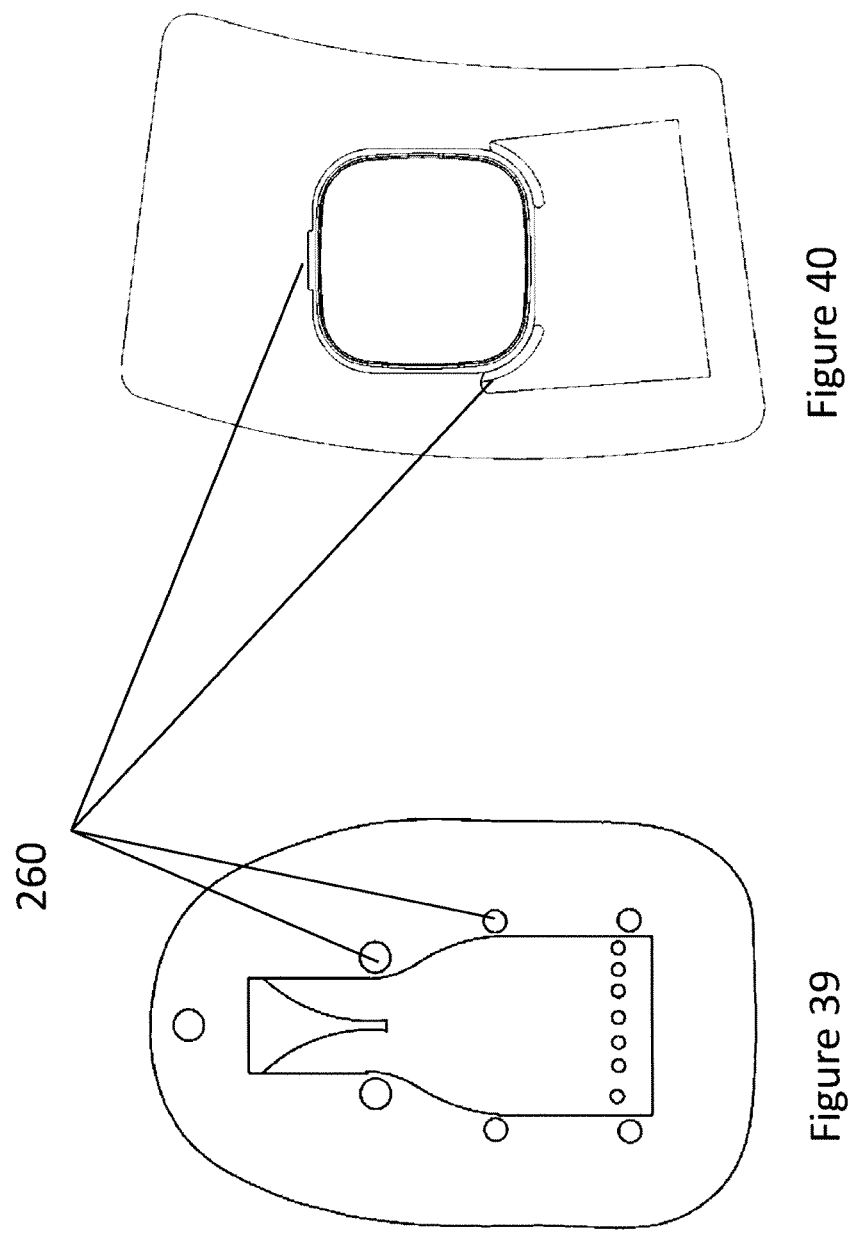

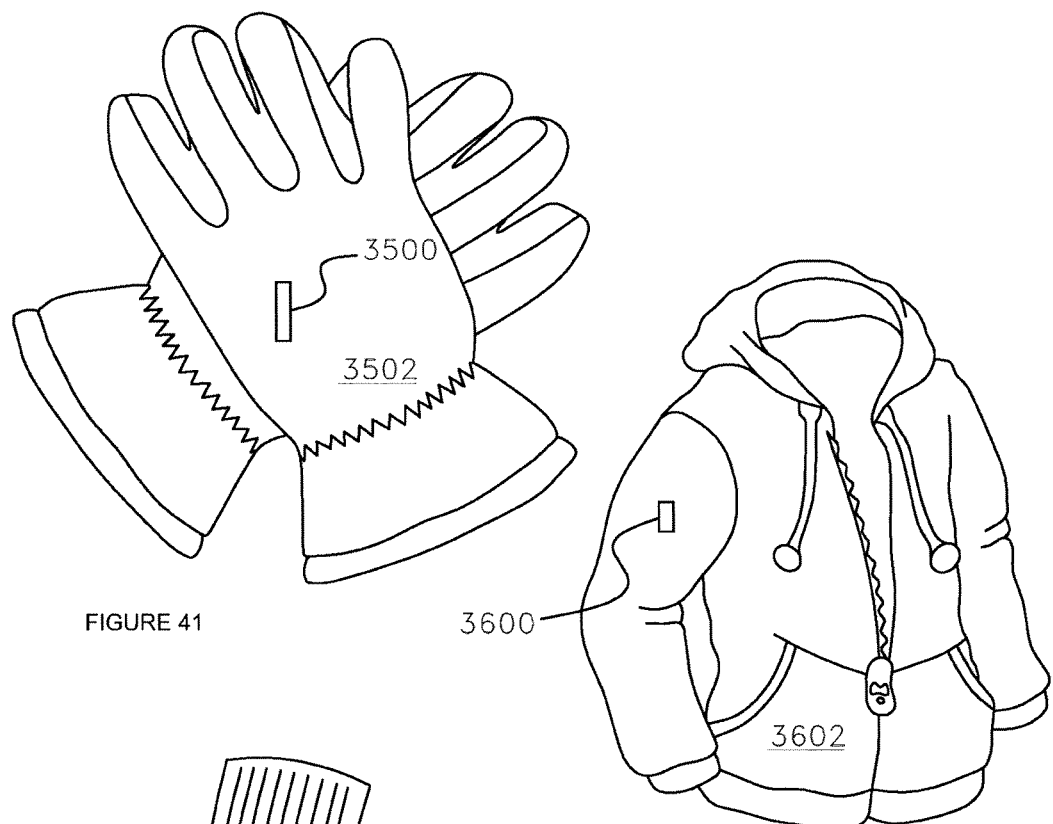
FIGURE 41
FIGURE 42
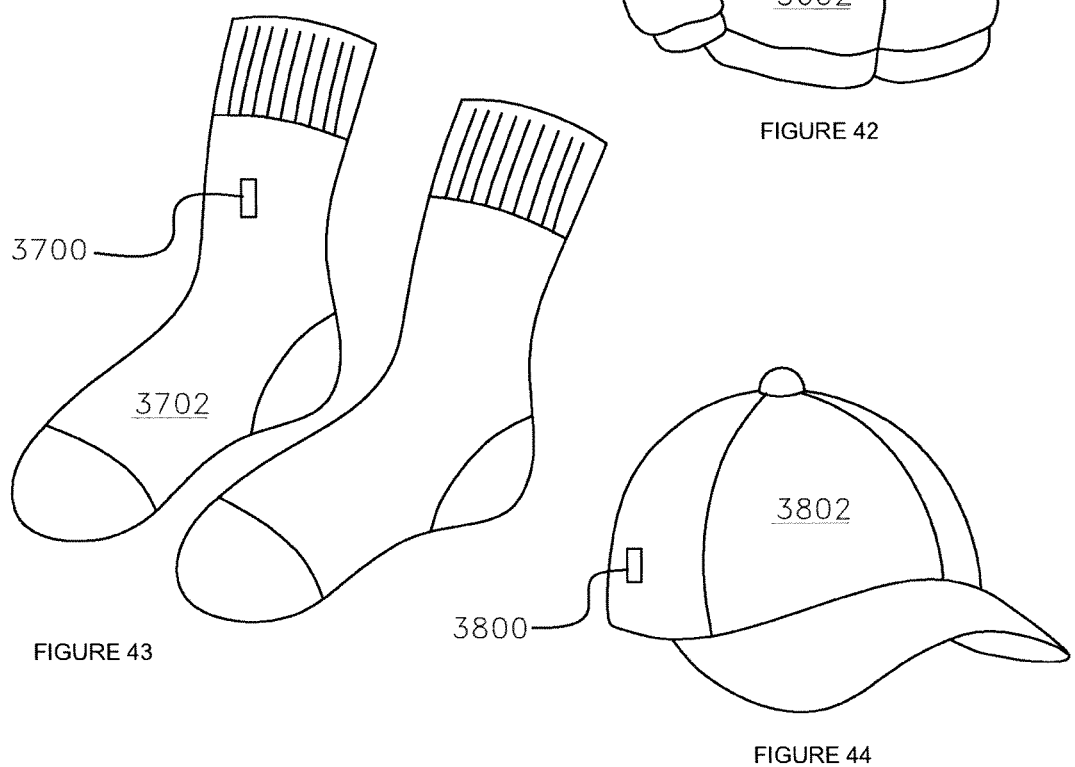
FIGURE 43
FIGURE 44

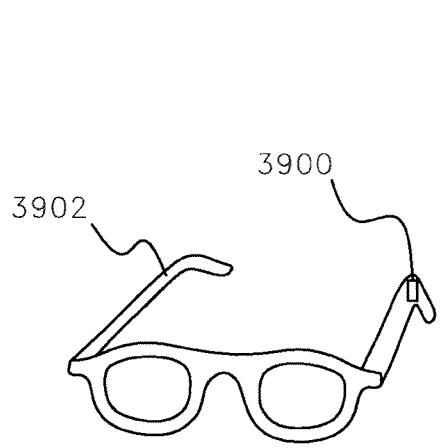
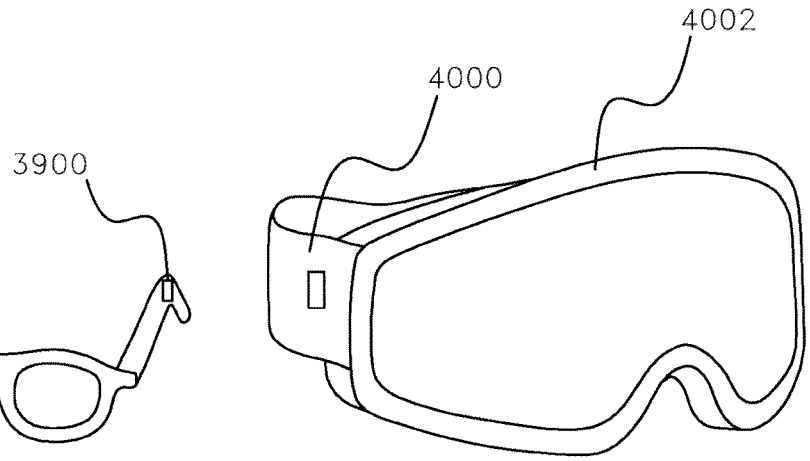
FIGURE 45
FIGURE 46
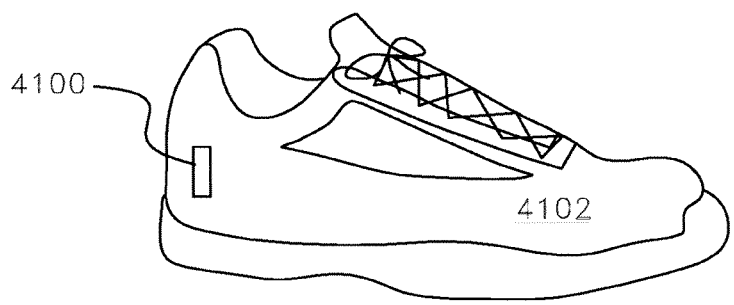
FIGURE 47
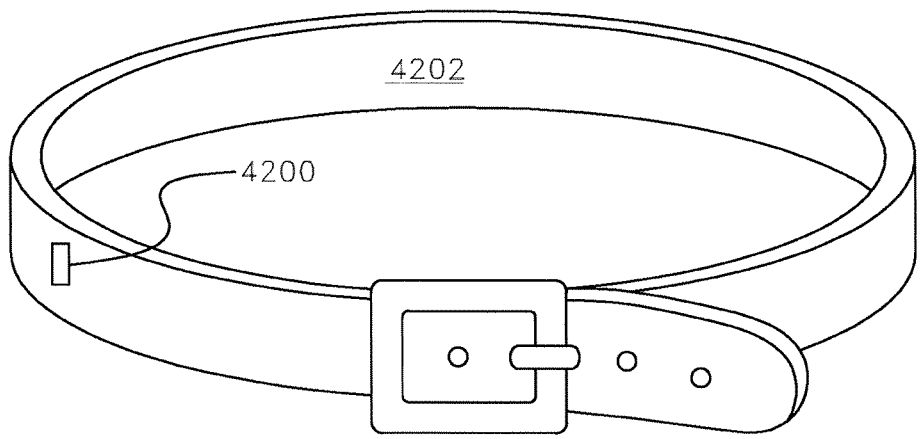
FIGURE 48

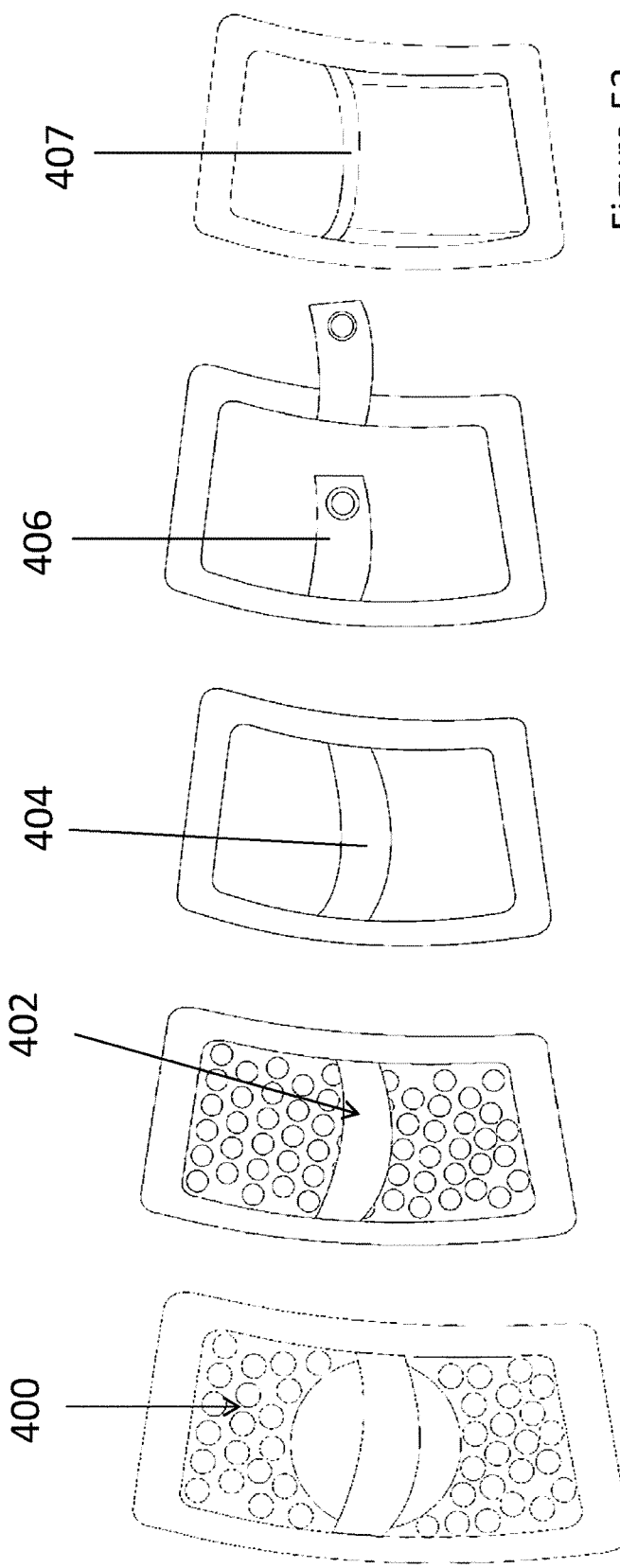

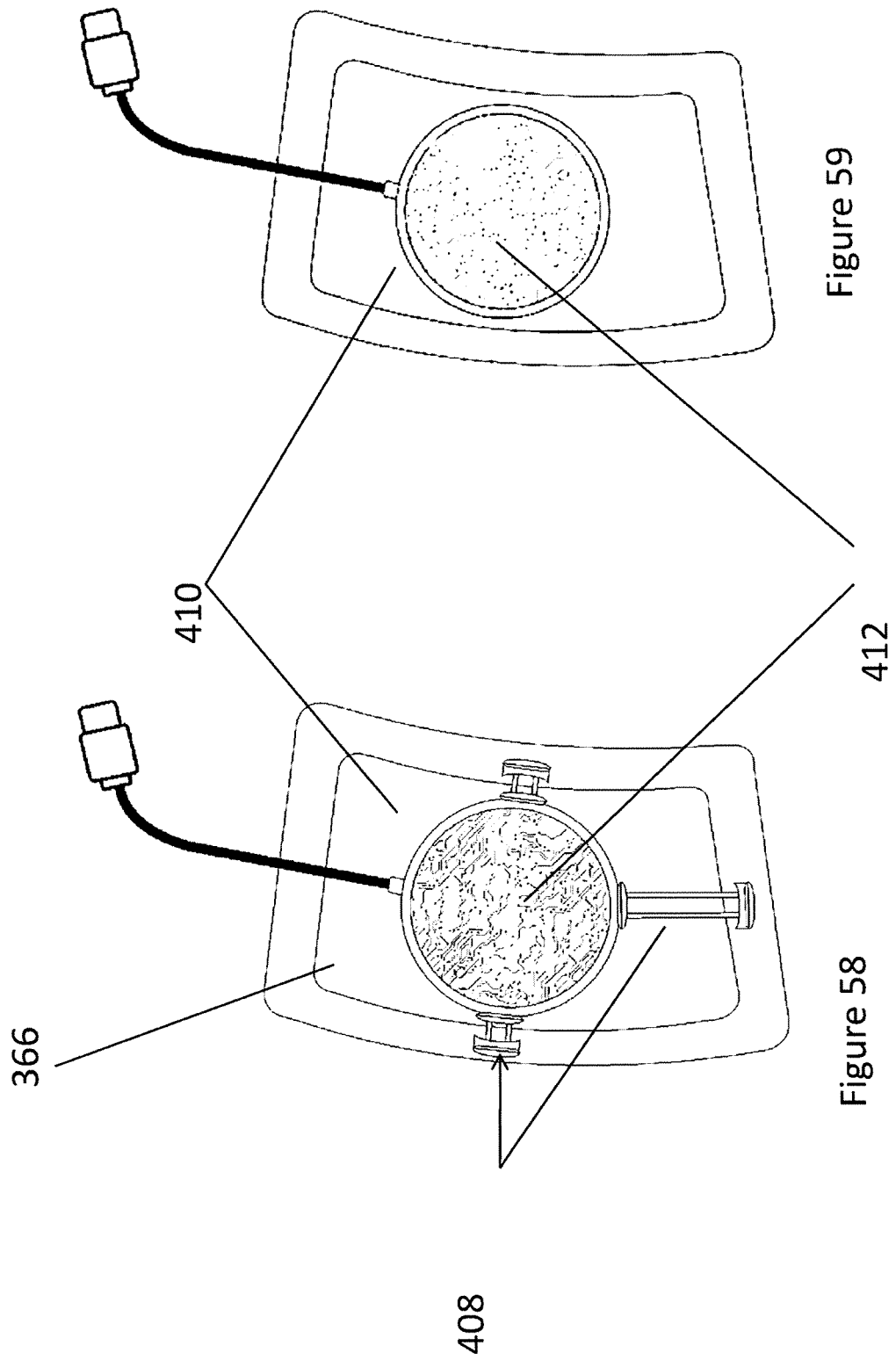

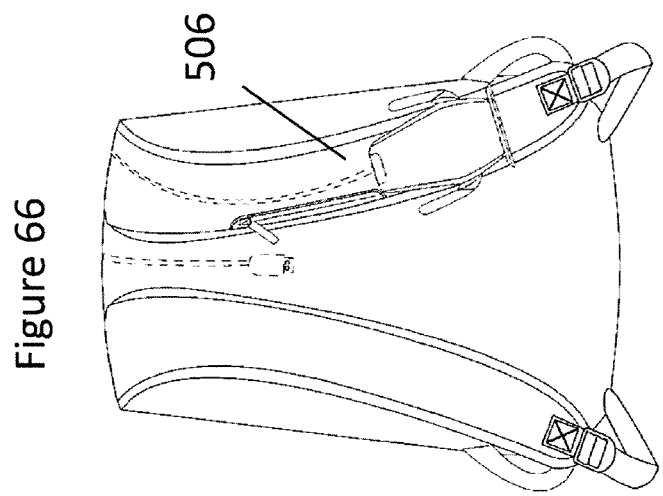
Figure 66
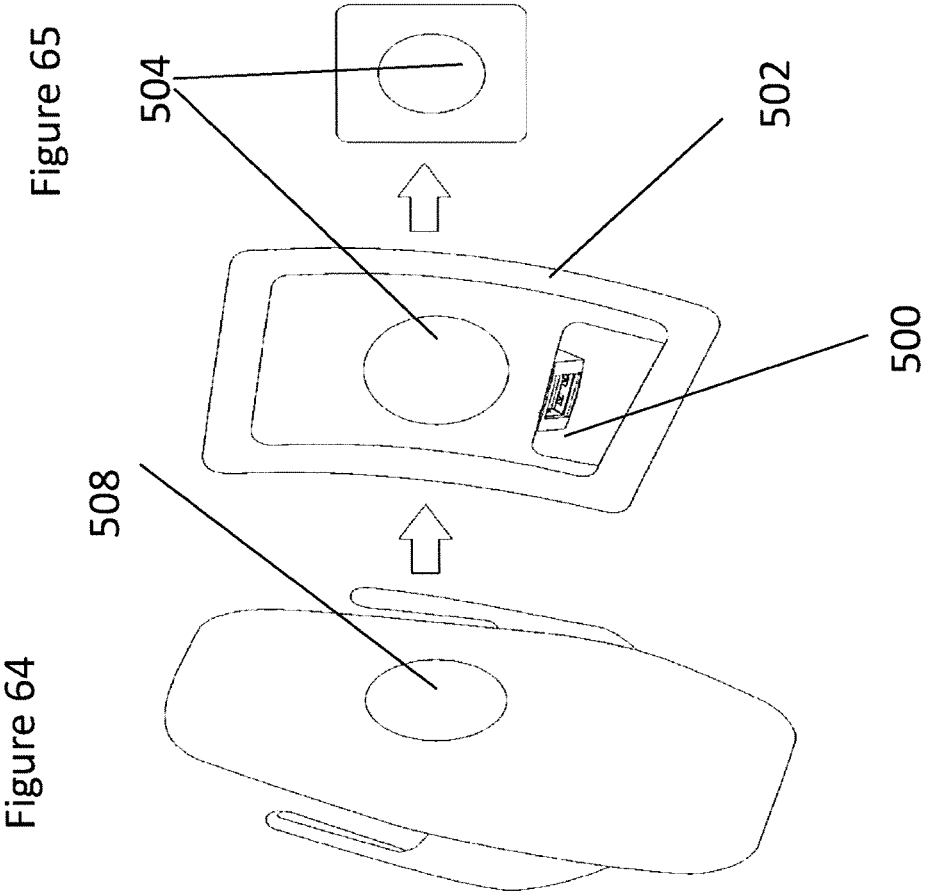
Figure 65
Figure 64

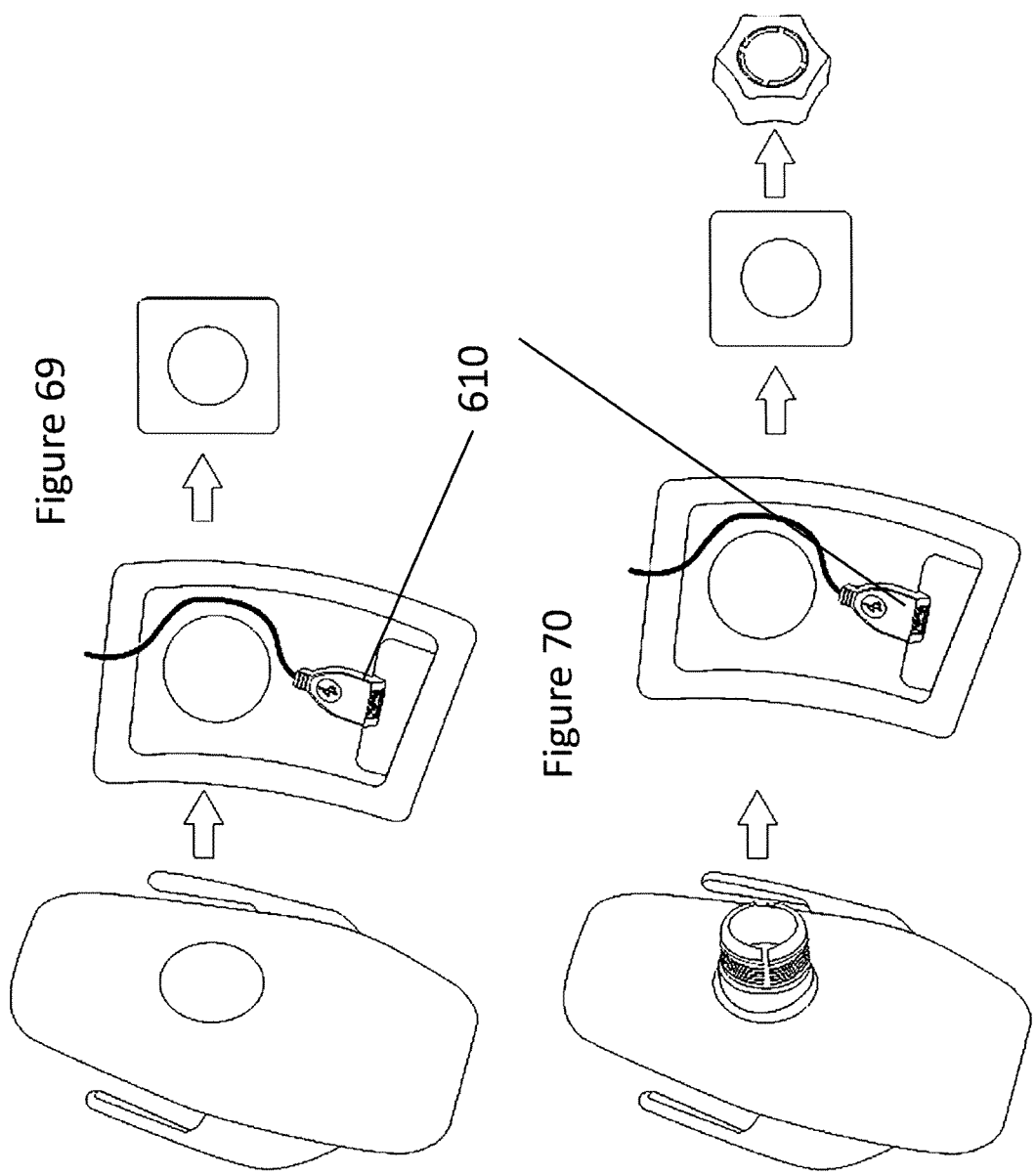

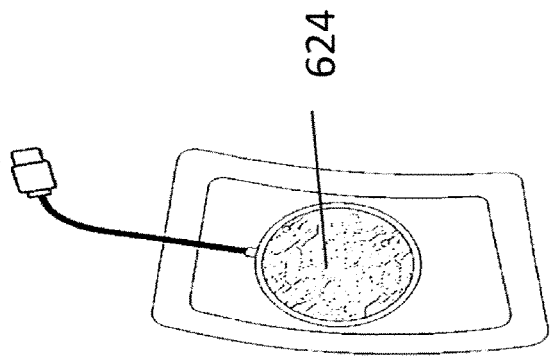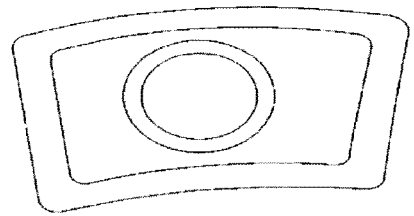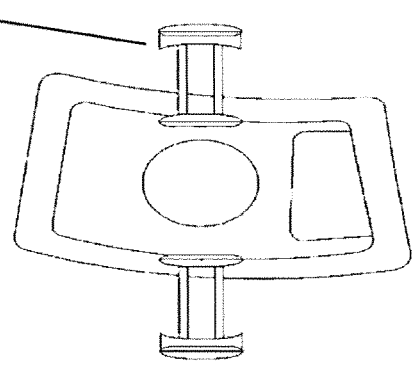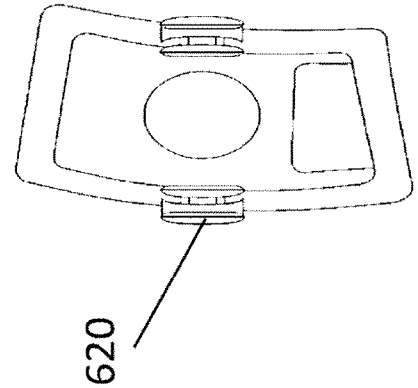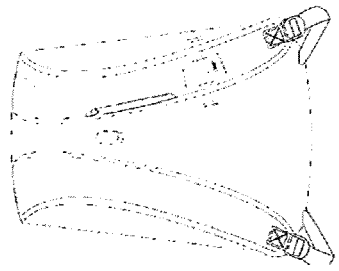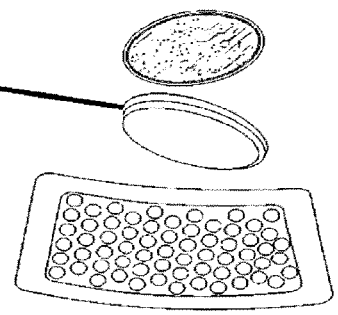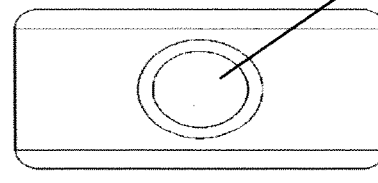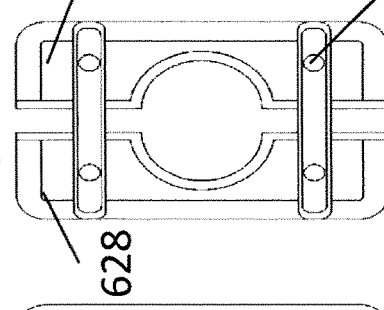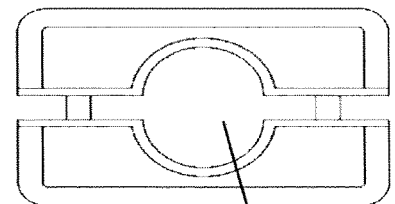

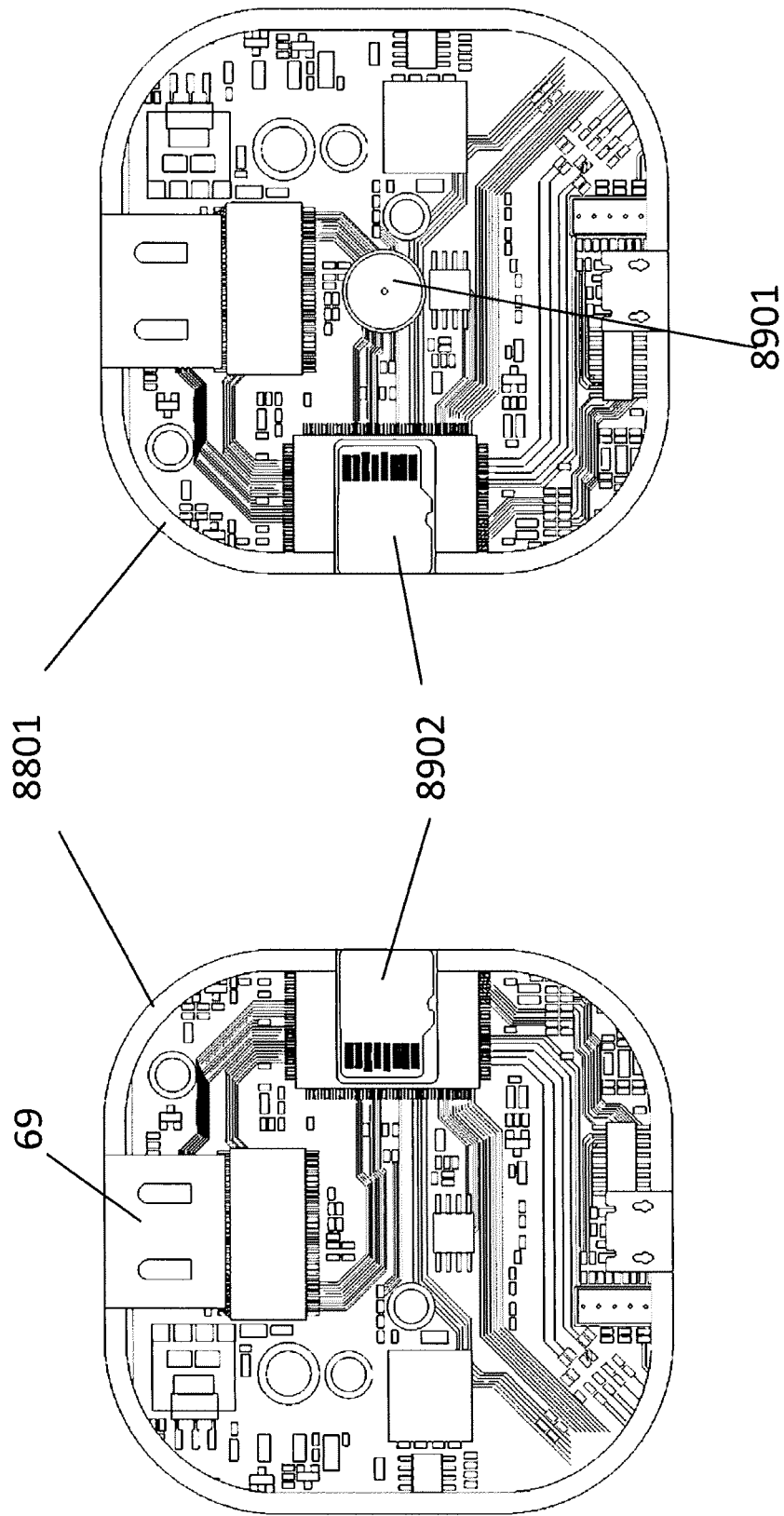

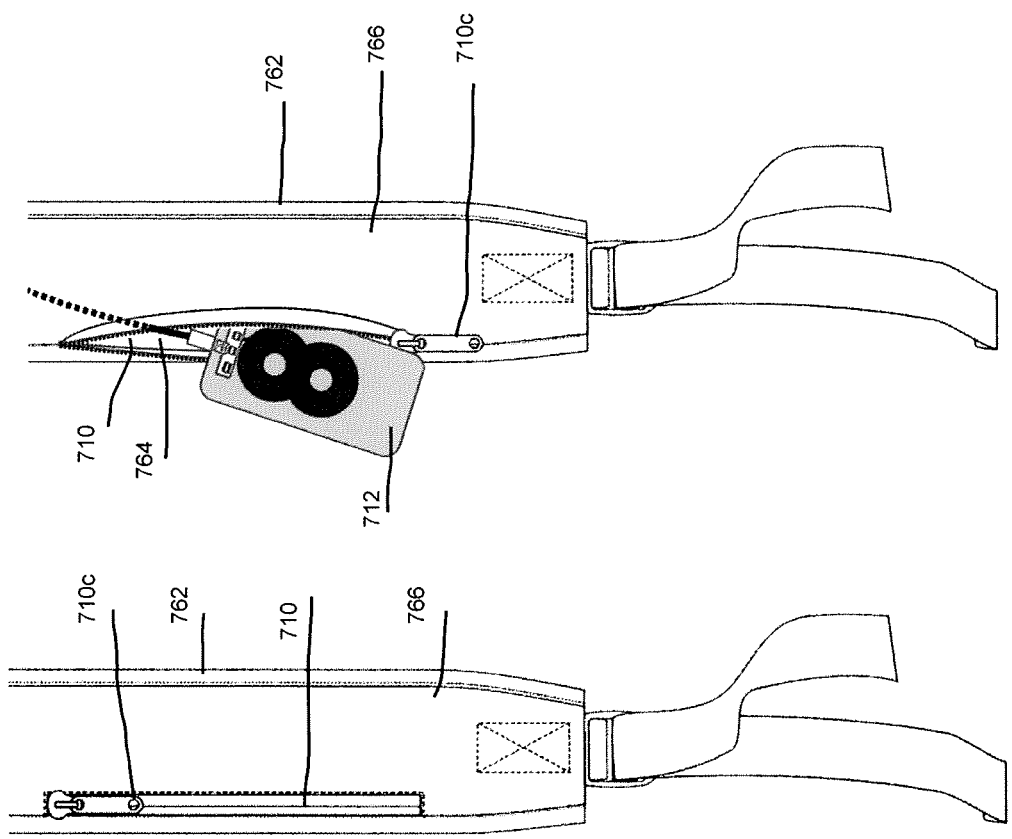

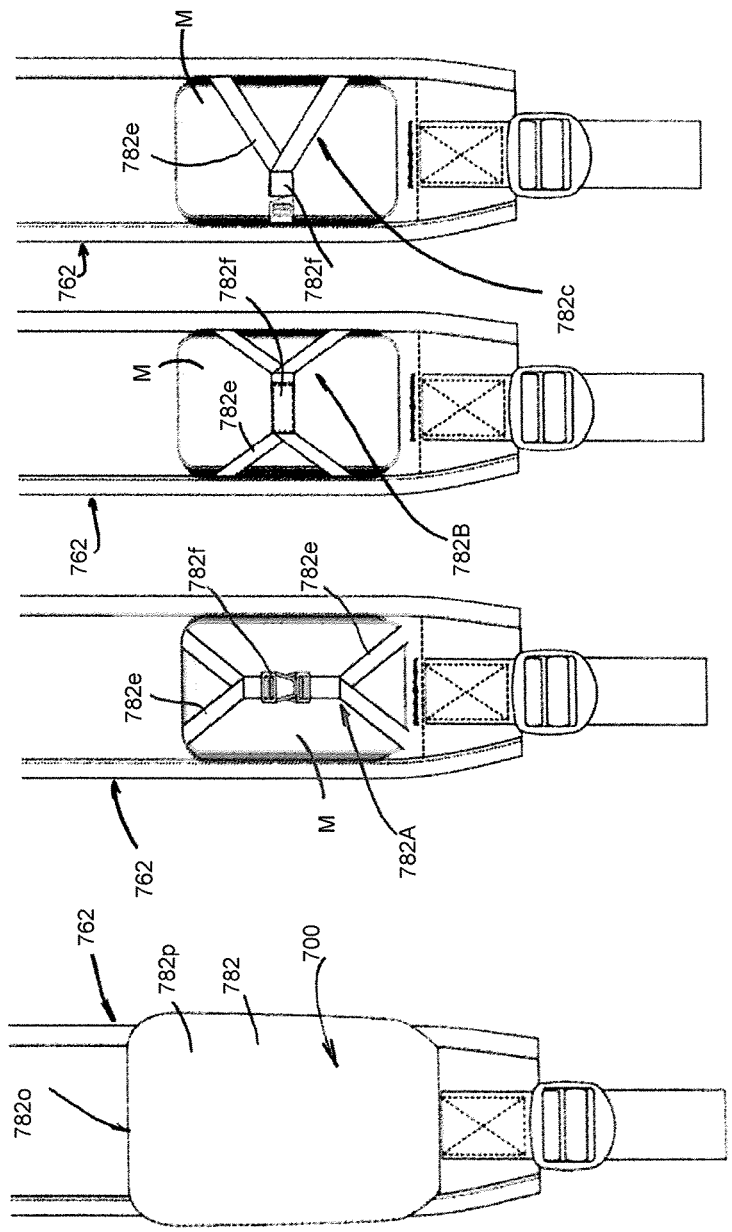

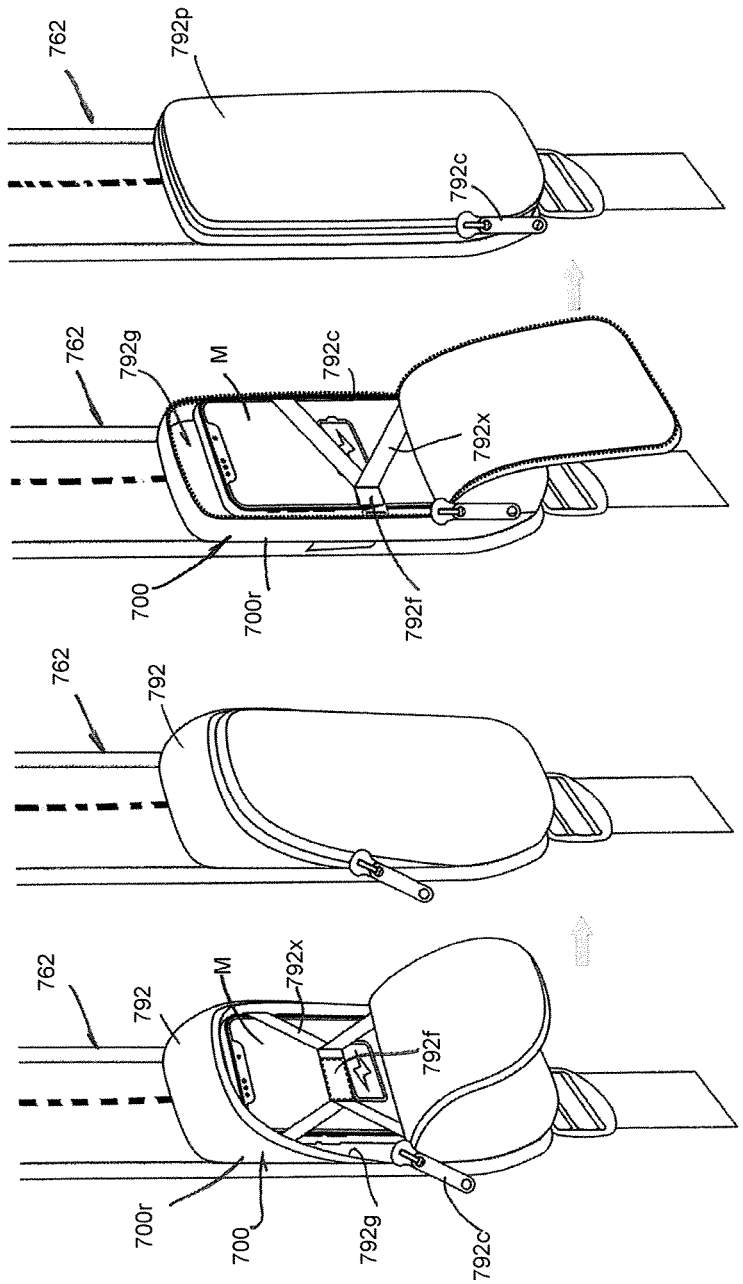

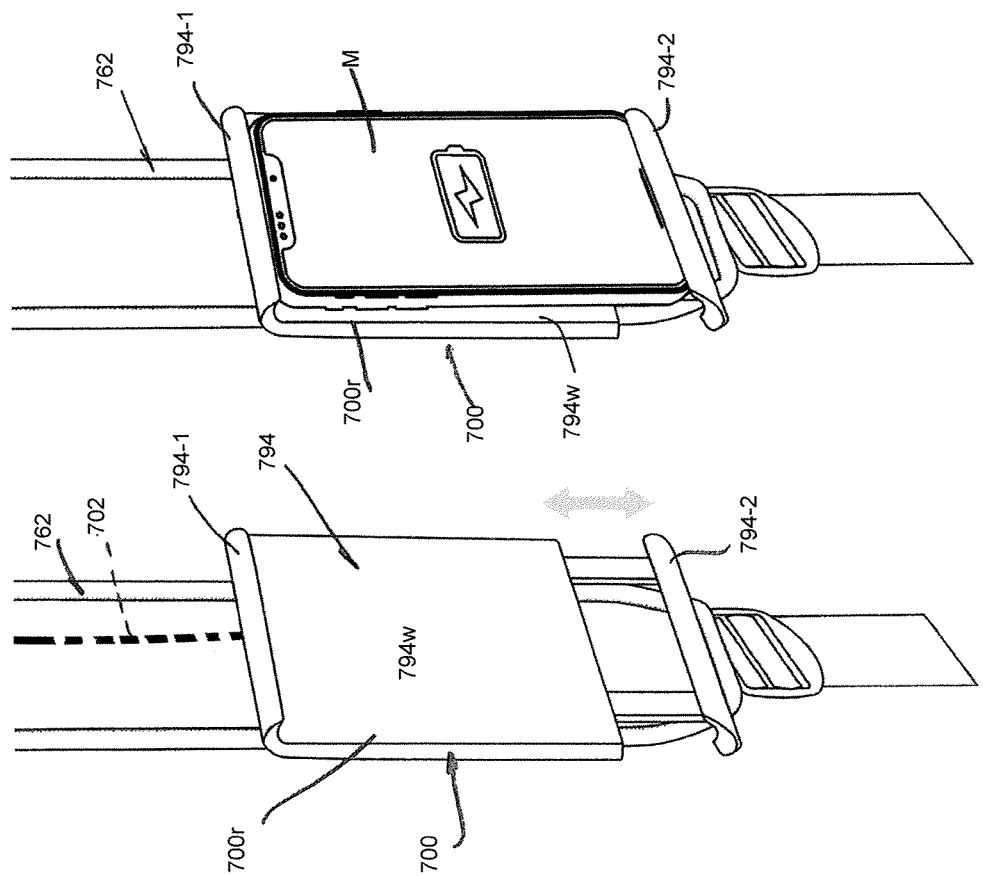

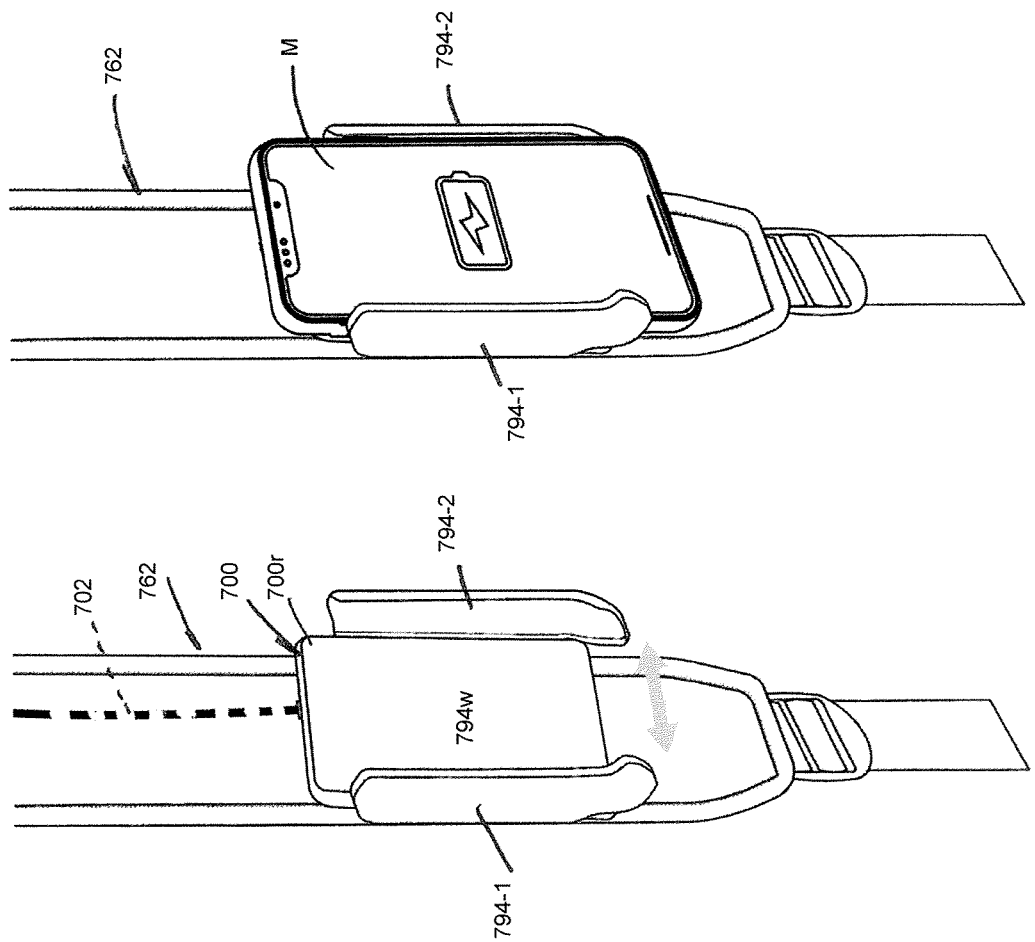

WIRELESS CHARGING SYSTEM FOR BACKPACK OR OTHER LUGGAGE

CROSS-REFERENCE TO RELATED APPLICATION

This application is a continuation-in-part of U.S. application Ser. No. 17/903,078 filed Sep. 6, 2022, which is a division of U.S. application Ser. No. 17/151,756 filed Jan. 19, 2021, now U.S. Pat. No. 11,735,949 issued Aug. 22, 2023, which is a continuation-in-part of U.S. application Ser. No. 16/838,059 filed Apr. 2, 2020, now U.S. Pat. No. 10,931,138 issued Feb. 23, 2021, which is a continuation-in-part of U.S. application Ser. No. 16/388,994 filed Apr. 19, 2019, now U.S. Pat. No. 10,931,137 issued Feb. 23, 2021, which is a continuation of U.S. application Ser. No. 14/836,104 filed Aug. 26, 2015, now U.S. Pat. No. 10,574,071 issued Feb. 25, 2020. U.S. application Ser. No. 17/151,756 is a continuation in part of U.S. application Ser. No. 16/388,994 filed Apr. 19, 2019, now U.S. Pat. No. 10,931,137 issued Feb. 23, 2021, which is a continuation of application Ser. No. 14/836,104 filed Aug. 26, 2015, now U.S. Pat. No. 10,574,071 issued Feb. 25, 2020, and claims priority to Chinese application number 201420692148.1 filed Nov. 18, 2014 and Chinese application number 201520737260.7 filed Aug. 20, 2015. U.S. application Ser. No. 17/151,756 filed Jan. 19, 2021 is a continuation-in-part of U.S. application Ser. No. 16/738,208 filed Jan. 9, 2020, abandoned, which is a continuation of U.S. application Ser. No. 16/007,055 filed Jun. 13, 2018, abandoned, which is a continuation of U.S. application Ser. No. 14/930,719 filed Nov. 3, 2015, abandoned. U.S. application Ser. No. 17/151,756 filed Jan. 19, 2021 is a continuation-in-part of U.S. application Ser. No. 17/151,741 filed Jan. 19, 2021, now U.S. Pat. No. 11,101,683 issued Aug. 24, 2021. U.S. application Ser. No. 17/903,078 filed Sep. 6, 2022 is a continuation of U.S. application Ser. No. 17/558,674 filed Dec. 22, 2021, now U.S. Pat. No. 11,601,009 issued Mar. 7, 2023. The entire disclosure of each of said prior applications is hereby incorporated by reference herein in its entirety.

TECHNICAL FIELD

The present invention model relates to a sheath for a USB or wireless charger for convenient charging of personal devices such as smart phones, tablets or any device that requires recharging.

BACKGROUND OF THE INVENTION

With the constant development of our society, diverse portable digital devices are emerging in our lives, and we rely more and more on them, including tablet computers, cellphones, digital cameras, video cameras and the like. In addition to containing the stuff, people want more functionality from the bags and luggage. For example, charging the portable digital devices. Especially for tourists, field staff and those making long-term business trips, it is not easy to charge their digital devices when the battery is dying, causing a lot of inconvenience and trouble in their works and lives. The sheath according to the present invention allows for bags, luggage, clothing, activewear and anything wearable or carried to be equipped with a charging function, or a portable power source. It is no longer necessary to open the bag, luggage or clothing for charging, which is convenient.

SUMMARY OF THE INVENTION

The present invention intends to overcome the disadvantages stated above, and provides a sheath that may be incorporated into luggage, bags, gloves, activewear, jacket, socks, shoes, hats, glasses, goggles, belts or anything wearable or that can be carried for convenient charging, which enables the user to charge a device or product needing to be charged conveniently at any time or any place during traveling, without necessarily opening the bag, luggage, or clothing nor taking out the power source for charging. The term "body" refers to any suitable base that the sheath may be attached to for easy charging, including, without limitation a bag, luggage, clothing, activewear, shoes, hats, glasses, belt or anything wearable or that can be carried. The present invention also addresses wireless charging.

According to one aspect of the present invention, a sheath for convenient charging is provided, comprising: a raised portion and a surrounding bottom portion, wherein the raised portion has a first closed end, a second open end and the surrounding bottom portion surrounds at least a portion of the raised portion, wherein at least a portion of the raised portion extends above an outer surface of a body, wherein the body has an inner surface, an outer surface and a fourth opening between the inner surface and the outer surface; wherein the fourth opening is between the inner surface and the outer surface, and the raised portion receives a female connector having an operative end and a cord end and a cord in communication with the cord end; wherein the operative end of the female connector is retained in the second open end of the raised portion and the cord end of the female connector is retained in the first closed end of the raised portion to provide the female connector of the UBS cable in a flat position with the operative end of the female connector being operable and above the outer surface of the body, wherein the surrounding bottom portion of the sheath is attached to a portion of the body, wherein the cord is connecting between the female connector and a battery inside of the body, wherein the female connector has an actuation button.

According to another aspect of the present invention, a sheath for convenient charging, comprising: a raised portion and a surrounding bottom portion, wherein the raised portion of the sheath has a first open end, a second open end and a surrounding bottom portion surrounding at least a portion of the raised portion, and at least a portion extends above an outer surface of a body, wherein the raised portion receives a female connector having an output operative end, an input operative end and a detachable cord connecting between the input operative end and a battery inside of the body, wherein the output operative end of the female connector is retained in the second open end of the raised portion and the input operative end is retained in the first open end of the sheath to provide the female connector in a flat position with the operative ends being operable and above the outer surface of the body, wherein the surrounding bottom portion is attached to a portion of the body, wherein one of the sides of the female connector has an actuation button.

According to another aspect of the present invention, a sheath for convenient charging is provided having a raised portion with a fixed holder for mobile phone and a bottom portion, and at least a portion of the bottom portion communicating with a body, wherein the fixed holder for mobile phone is extends above a surface of a body, and adjustable to tightly hold different sizes, different shape of mobile phone, wherein the sheath has an opening, the rear side of raised portion receives a wireless charger, and the wireless charger stays inside of the raised portion, and can be removed from the opening of the sheath, wherein the raised portion and the fixed holder are positioned to make the wireless charger and mobile phone communicate with each other.

According to another aspect of the present invention, a sheath for convenient charging, comprising: a raised portion with a second open end, and a bottom portion, a power storage space in the body, and a magnet component, a USB cable having a female connector with an operative end, wherein the magnet component is configured to receive a mobile phone wireless charging holder which has a magnetic adjustable component, wherein at least a portion of the bottom portion is in communication with a body, wherein, at least a portion of the sheath extends above a surface of a body, wherein the operative end of the female connector is retained in the second open end of the raised portion to provide the female connector of the UBS cable in a firm and flat position with the operative end of the female connector being operable and above the surface of the body, wherein an exit on the body is adjacent to the sheath for the cable going through, which connects the female connector in the sheath to a power storage space in the body, wherein the mobile phone wireless charger connects to the operative end of the female connector.

According to another aspect of the present invention, a sheath for convenient charging, comprising: a raised portion with a second open end, a bottom portion, a power storage space in a body, and a universal adaptation nut, wherein the universal adaptation nut is configured to receive a mobile phone wireless charging holder, wherein at least a portion of the bottom portion is in communication with the body, wherein, at least a portion of the sheath extends above a surface of the body, wherein the operative end of a female connector is retained in the second open end of the raised portion to provide the female connector of the UBS cable in a firm and flat position with the operative end of the female connector being operable and above the surface of the body, wherein an exit on the body is adjacent to the sheath for the cable going through, which connects the female connector in the sheath to a power storage space in the body, wherein the mobile phone wireless charger connects to the operative end of the female connector.

According to another aspect of the present invention, a sheath for convenient charging, comprising: a raised portion with a fixed adjustable mobile phone holder and a bottom portion, wherein the fixed adjustable mobile phone holder is adjustable to tightly hold different sizes, different shape of mobile phone, wherein the raised portion contains wireless charging components that are fixed inside of the sheath, wherein the sheath is on a body with a cable laying channel going from the sheath to a power storage space in the body, wherein at least a portion of the bottom portion is in communication with the body, wherein the raised portion and the fixed holder are attached to make the wireless charger and mobile phone is communication with each other, providing a stable position for a mobile phone charging by a wireless charger on the outer surface of the body.

According to another aspect of the present invention, a sheath for convenient charging is provided, comprising: a raised portion with a fixed holder for mobile phone and wireless charger, wherein the fixed holder is adjustable to tightly hold the both mobile phone and wireless charger in different sizes, different shapes, wherein at least a portion of the sheath is firmly attached on a body, and at least a portion of the holder extends above an outer surface of the body, wherein the raised portion with a fixed holder is attached to provide the wireless charger and the mobile phone in communication with each other, providing a stable position for a mobile phone charging by a wireless charger on the outer surface of the body.

According to another aspect of the present invention, a sheath for convenient charging, comprising: a raised portion with a second open end, a bottom portion, a power storage space in a body, and a bracket for fixing, wherein the bracket for fixing is configured to receive a mobile phone wireless charging holder, wherein at least a portion of the bottom portion is in communication with the body, wherein, at least a portion of the sheath extends above a surface of the body, wherein the operative end of a female connector is retained in the second open end of the raised portion to provide the female connector of the UBS cable in a firm and flat position with the operative end of the female connector being operable and above the surface of the body, wherein an exit on the body is adjacent to the sheath for the cable going through, which connects the female connector in the sheath to a power storage space in the body, wherein the mobile phone wireless charger connects to the operative end of the female connector.

According to a further aspect of the present development, a wireless charging cable system includes a body with outer surfaces and inner surfaces. A charging cable includes a wireless charging end including a wireless charger and an input operative end, said charging cable at least partially located in the body between the inner surfaces. A raised portion is located on one of the outer surfaces of the body. A power storage space is provided in the body to hold an associated battery. A tunnel is located between the inner surfaces of the body for the cable to extend through from a rear side of the raised portion to the power storage space. The tunnel includes at least one exit for the input operative end of cable to extend out of the tunnel and extend to the power storage space. The raised portion includes at least one holding component configured to secure an associated mobile device firmly to the raised portion. The wireless charger is fixed by a fixing component to at least one of the inner surfaces of the body to secure the wireless charger firmly in an operative position adjacent the raised portion to improve a wireless charge coupling between the associated mobile device and the wireless charger.

According to another aspect of the present development, the body is shoulder strap of a backpack or other article of luggage that includes an access opening to the tunnel adjacent the wireless charging device to facilitate replacement of the wireless charging device.

According to another aspect of the present development, the wireless charger comprises at least two charging contacts to ensure continuous charging, and wherein the at least two charging contacts are covered by a substantially rigid material to protect the wireless charger and the associated mobile device.

During traveling, when the battery of the product to be charged is dying, it is only necessary to plug the charging interface of the product to be charged into the female end of the USB cable, or place the product on the wireless charger, then the charging starts, without necessarily opening the bag or luggage, nor taking out the power source for charging. And nowadays, many consumer have wireless chargers, which may be inconvenient to use when they are walking, running, climbing, etc, outside. The present invention offers a sheath which can help to hold the wireless charger, then consumers can "turn material resources to good account".

The sheath may be further equipped with a dust cap for dust proofing. The sheath may also have openings for ventilation, to prevent overheating of the device. The power cable outlet may be provided on the surface of the body, the female connector is operatively exposed outside the power cable outlet, and a dust cap may be attached on the side of the female connector. For the convenience of the configuration of the USB extension cable, the bag or luggage body may be provided with a cable laying channel from the power storage device placing space to the power cable outlet for the penetration of the USB extension cable. In order to prevent the loss of the bag or luggage, the female connector of the USB extension cable may be further equipped with a Bluetooth anti-lost alarm, which is used to connect to the Bluetooth device on the product to be charged. For real-time positioning or location of the bag or luggage for convenient charging provided by the utility model, the female connector of the USB extension cable may be further equipped with a GPS device for positioning (or locating).

Compared with the prior art, the present invention enjoys the following advantages 1) provides a body for convenient charging, which enables a user to charge a product needing to be charged conveniently at any time or any place during traveling, without necessarily opening the bag or luggage, nor taking out the power source for charging. 2) the charging interface is featured with waterproof and dust-proof functions, resulting in reliable performance; 3) the flat position of the female end of the USB provides a sturdy position for the external USB cable to connect to. In this way, a user may with one hand attach an external USB cable; 4) the flat position of the wireless charger raised above the surface of the body provides a sturdy position for the device to be charged. The sheath may also be typically installed to face down towards the ground on the body. This also provides an additional level of waterproofing, as the open end is faced downward.

BRIEF DESCRIPTION OF THE DRAWINGS

The development is further described as follows with reference to drawings and embodiments:

FIGS. 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112A, 112B, 112C, 113, 114A, 114B, 115A, 115B, 116A, 116B, 117A, 117B, 118A, 118B, 119, 120, 121, 122, 123 and 124 depict aspects of the present invention.

DETAILED DESCRIPTION OF THE EMBODIMENTS

The content of the disclosure is further described in detail as follows with reference to the drawings for specification and specific embodiments.

Figure 1:
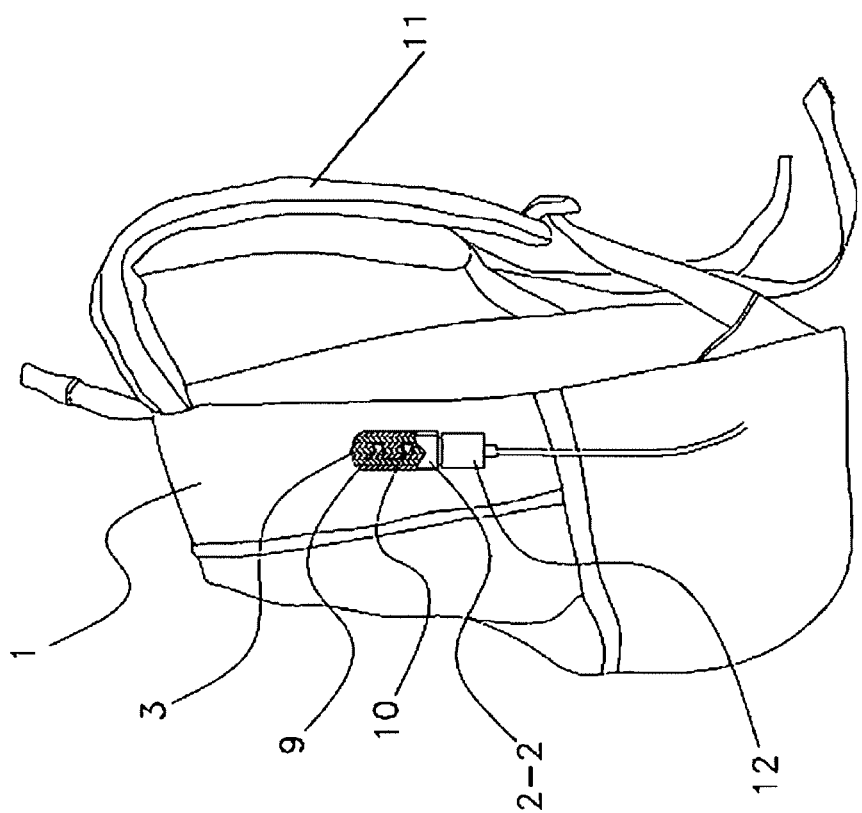
Figure 2:
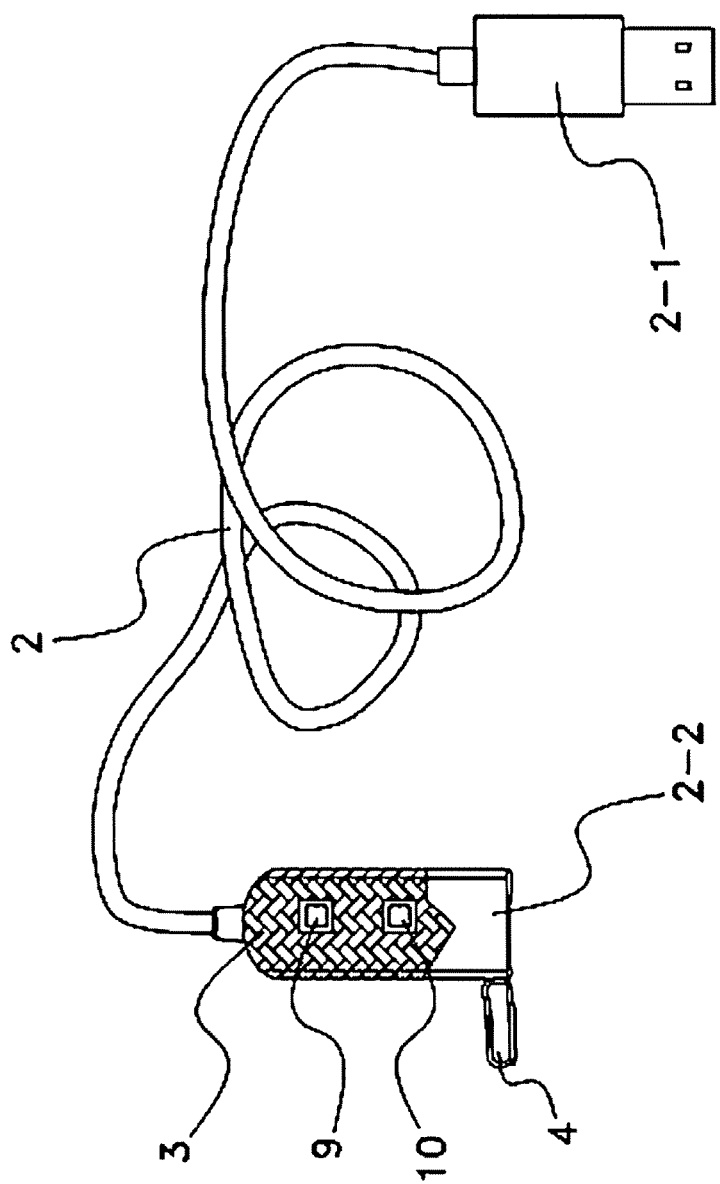

FIGS. 1-2 depict an example of a bag for convenient charging according to the present invention. As shown, there is a luggage body 1 having a placing space for placing a power storage device inside the luggage body and a power cable outlet on the outer surface of the luggage body 1; a USB extension cable 2 having a male connector 2-1 and a female connector 2-2 on the luggage body 1, wherein the male connector 2-1 of the USB extension cable is inside the luggage body 1 and is used to connect to the power storage device in the placing space; wherein the female connector 2-2 is in the power cable outlet or exposed outside the power cable outlet, and the female connector 2-2 is equipped with a sheath 3 wrapped on the outer surface of the female connector 2-2 for water proofing. The term "luggage body" includes any bag, bag body, purse, backpack, luggage or the like. The placing space would typically be a pocket on the inside of the luggage body that holds the power storage device. The power storage device may be any device capable of charging a device. The sheath 3 may be further equipped with a dust cap 4 for dust proofing. The power cable outlet is provided on the surface of the luggage body, the female connector 2-2 is exposed outside the power cable outlet, and the dust cap 4 is attached on the side of the female connector 2-2. The power cable outlet may be provided in a groove 5 on the side of the luggage body, the female connector is in the power cable outlet, and the dust cap is at the opening of the groove and connected to the groove. The power cable outlet may be under the sheath 3 and therefore not viewable in FIG. 1. This allows the USB extension cable 2 to be on the inside of the bag or body and connect to, for example, a power bank contained on the inside of the bag or luggage body. The luggage body may be provided with a cable laying channel from the power storage device placing space to the power cable outlet for the penetration of the USB extension cable 2. The male connector of the USB extension cable is further equipped with a wireless technology standard for exchanging data over short distances (e.g. Bluetooth™) as an anti-loss alarm 9, which is used to connect to the device on the product to be charged. The Bluetooth™ on the USB extension cable would connect with the Bluetooth™ on, for example, a phone and could be used to locate the luggage body. The male connector of the USB extension cable may be further equipped with a GPS device 10 for positioning. The term positioning may be interchanged with locating. The power cable outlet may be on a shoulder strap 11 of the bag. The sheath as depicted in FIGS. 1 and 2 is a woven material or a plastic material that has at least one ventilation opening (the woven layers provide openings between each of the woven layers). The openings are small, as to protect the female connector contained inside.

During traveling, when the battery of the product to be charged is dying, it is only necessary to plug the external USB connecting line 12 to the female connector 2-2 of the USB extension cable 2, then the charging starts, without necessarily opening the bag or luggage, nor taking out the power source for charging.

FIG. 2 shows embodiment 2 of the utility model, which is different to the embodiment 1 that the sheath 3 is further equipped with a dust cap 4 for dust proofing, and the dust cap 4 is attached on the side of the female connector 2-2, which is overturning connected to the side of the female connector 2-2.

FIGS. 3, 4, 5, 6, 7, 8, 9, 10 and 11 are intended to depict that the raised portion of the sheath may take many shapes and forms. FIG. 3, for example depicts a curved raised portion 30, FIG. 4, depicts a curved raised portion 32 with a surrounding bottom portion 34. FIG. 5 depicts a raised substantially rectangular shape 36 with a surrounding bottom 38 which retains the output operative end of a female connector in a second open end 39 of the sheath to provide the female connector in a flat position and protected by a first side portion 40 and second side portion 42. The raised portion has a first closed end 41, a second open end 39 and the surrounding bottom portion 38 surrounds at least a portion of the raised portion FIG. 5 also include an actuation button 37 in the top side of the sheath. The first side portion 40 and the second side portion 42 also act to guide the output operative end of a female connector into the open end of the sheath. FIG. 6 depicts an example of a dome shaped raised portion 44. FIG. 7 depicts an example of a raised circular shape 46. FIG. 8 depicts an example of a raised semi-circular shape 48. FIGS. 9 and 11 depicts examples of raised polygon shapes (e.g. 50 and 54). FIG. 10 depicts an example of raised square shape 52.

FIGS. 12 and 13 are intended to show the sheath attached to a body and two different examples of openings between the inner surface and outer surface of the body. As shown, the sheath 60 has a raised portion and a surrounding bottom portion, wherein the raised portion has a first closed end, a second open end and the surrounding bottom portion surrounds at least a portion of the raised portion (see FIG. 5 for additional detail). At least a portion of the raised portion extends above an outer surface of a body (in this case shoulder strap 62). The body has an inner surface (inside of shoulder strap 64, an outer surface 66 and a fourth opening 68 between the inner surface and the outer surface. As shown in FIG. 12, the fourth opening is a zipper that is adjacent to the sheath to allow for adjustment or removal of the USB cable 70. FIG. 13 depicts an example in which the fourth opening 72 is near or adjacent to the location of the sheath 76. The sheath may be on top of and cover the fourth opening 72. This may be permanently fixed and not allow for removal of the USB cable 74. The fourth opening is between the inner surface and the outer surface, and the raised portion receives a female connector having an operative end and a cord end and a cord in communication with the cord end. FIGS. 14, 15, 16 and 17 are intended to depict an example of how the USB cable may be received in the sheath. FIG. 14 is a top view of a sheath with an actuation button 75 and second open end 77. Note the bottom surrounding portion in not shown in FIG. 14. FIGS. 15 and 16 depict a bottom view of a sheath with a bottom surrounding portion 80. The operative end 76 of the female connector is retained in the second open end 82 of the raised portion and the cord end of the female connector is retained in the first closed end 100 of the raised portion to provide the female connector of the UBS cable in a flat position with the operative end of the female connector being operable and above the outer surface of the body. The surrounding bottom portion of the sheath is attached to a portion of the body. FIGS. 17 and 18 are intended to depict that a portion of the body may have a fourth opening 92. FIG. 17 depicts the outer surface 96 of the body and FIG. 18 depicts the inner surface 94 of the body. The raised portion 98 of the sheath may be a corresponding size and shape to the fourth opening. The sheath has a first closed end 100, top side 102, right side 104, left side 106. In this way the surrounding bottom portion is under the outer surface of the body 96. This acts to secure the sheath with the surrounding portion not seen and provides stability. See FIG. 12, the cord is connecting between the female connector 69 and a battery 65 inside of the body. The battery 65 may be held inside a power storage space 67. The cable laying channel is built on the body, from the sheath to the power storage space inside of the body. The power storage space may be a pocket on the interior of a bag as shown. The female connector may have an actuation button 75. If the female connector has an actuation button, there may be a third opening 81 in the sheath that is similarly shaped to allow the actuation button to be actuated and surrounds the actuation button. The actuation button may actuates the function of recording and storing voice recording, photoshooting, music controlling or any other function on a phone, tablet or other device. See FIG. 88, 89, the actuation button 8901 may be on a mainboard 8801, and further equipped with a wireless technology standard for exchanging data over short distances as an anti-loss alarm, which is used to connect to the device nearby to be charged. A corresponding side of the sheath has at least one corresponding button communicating with the top of the actuation button, which connects to the mainboard of the female connector. The mainboard in the female connector has a Bluetooth actuator for connecting and controlling a device nearby to be charged. The mainboard may further comprises a memory card 8902. There may be a GPS device for positioning contained in the female connector.

Figure 19:
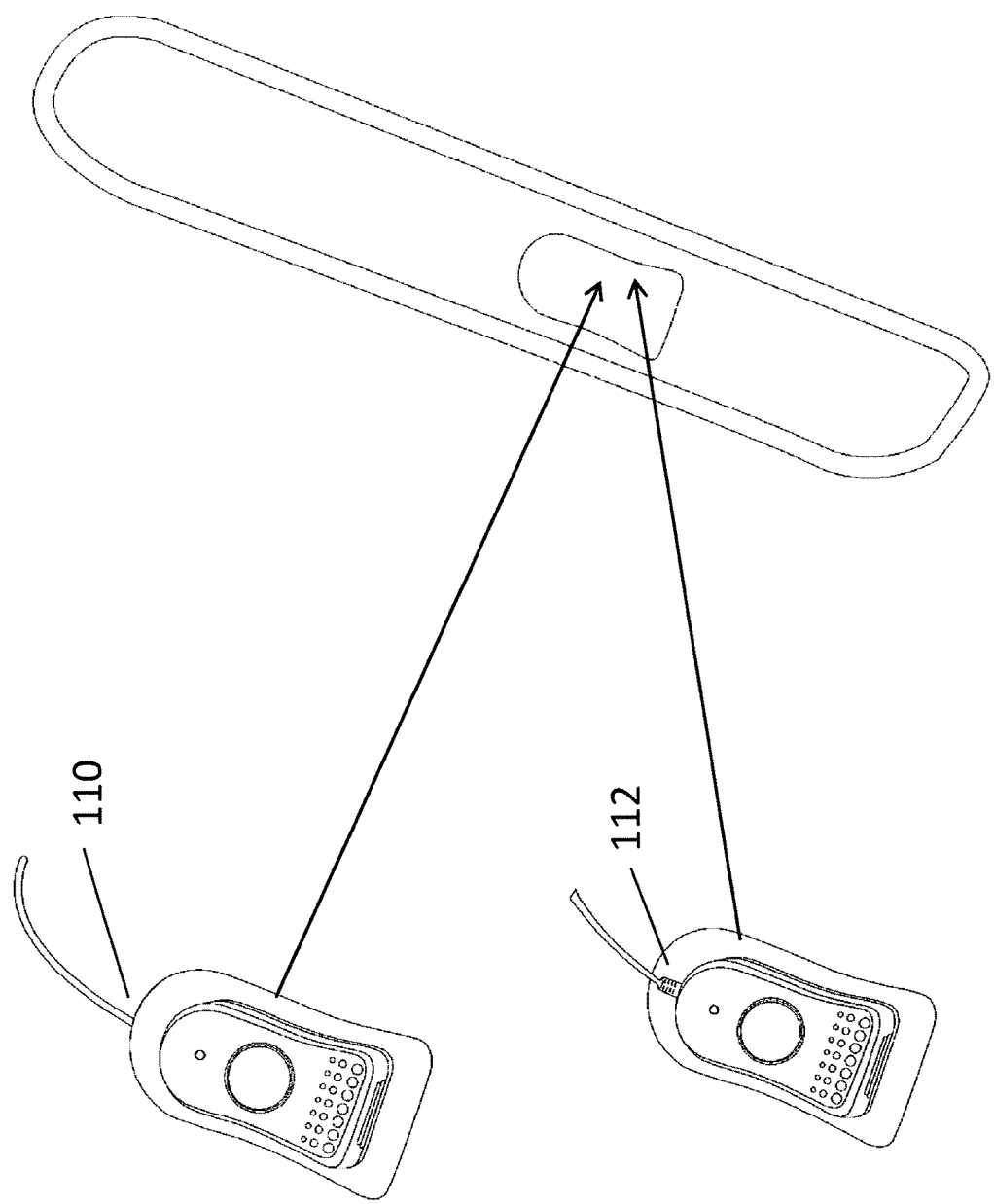

FIG. 19 depicts two options of the location of the cord. The cord 110 may remain under the inner surface of the body (under the surrounding bottom portion and stay in the cable laying channel. Alternatively, the cord 112 may be on top of the outer surface of the body (above the surrounding bottom portion).

Figure 20:
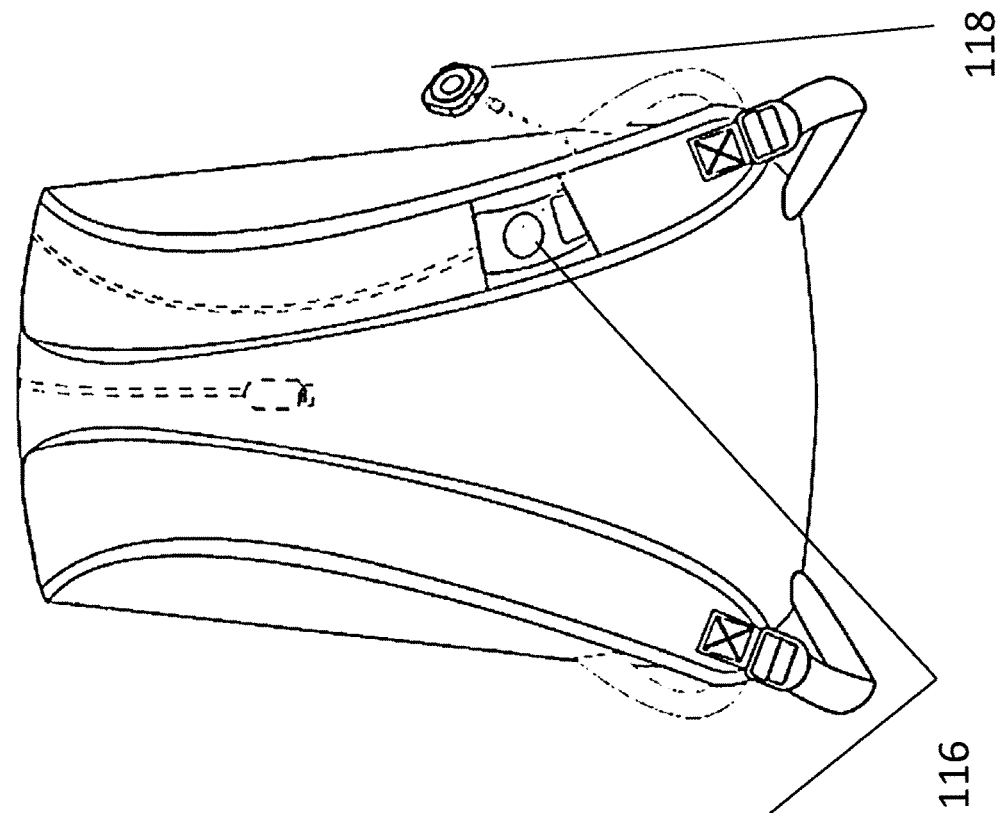
Figure 21:
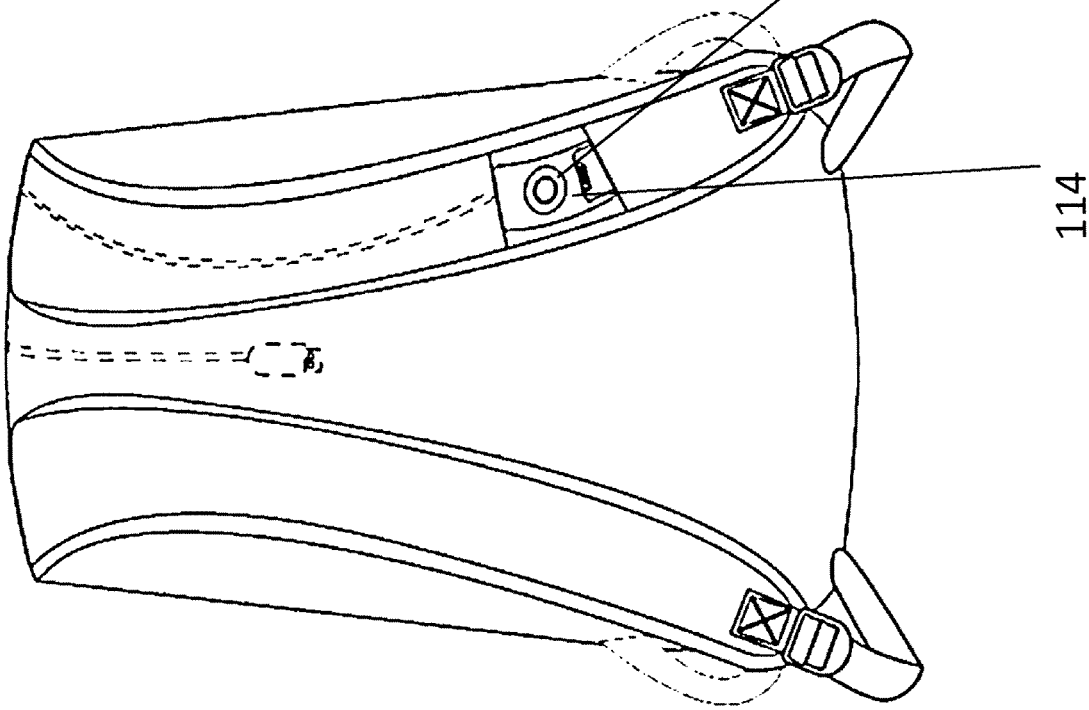

FIGS. 20 and 21 depict the sheath 114 with a third opening 116 that may receive a female connector/USB interface connector 118 that sits inside the third opening 116. FIGS. 22 and 23 depict one example of a sheath with a first closed end 120, a left side 122, a right side 124, a top side 126, a surrounding bottom portion 132, third opening 130, second open end 128 and actuation button 134.

Figure 24:
Figure 25:
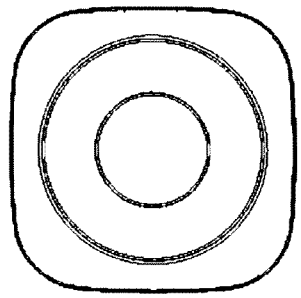
Figure 26:
Figure 28:
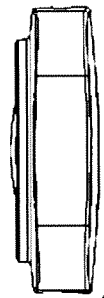
Figure 29:
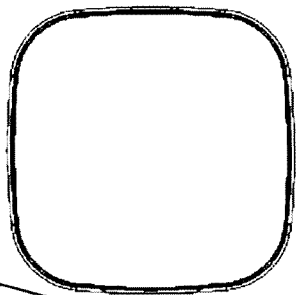
Figure 27:
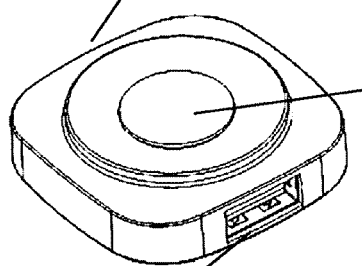
Figure 30:
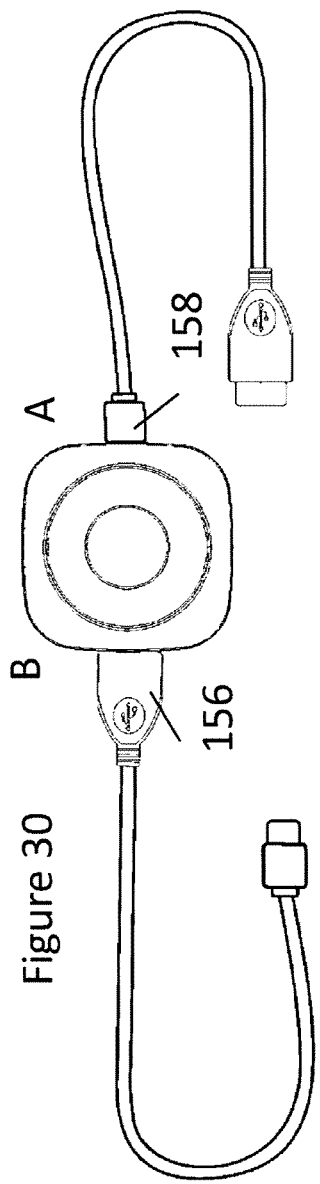
Figure 34:
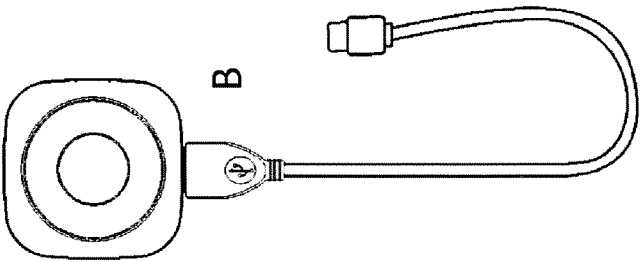
Figure 33:
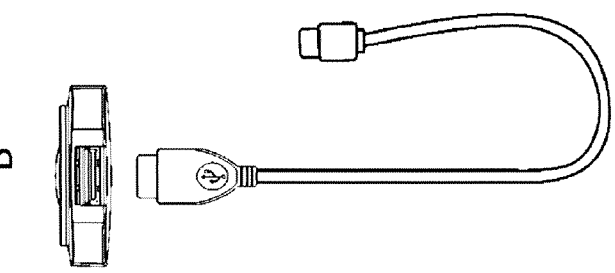
Figure 32:
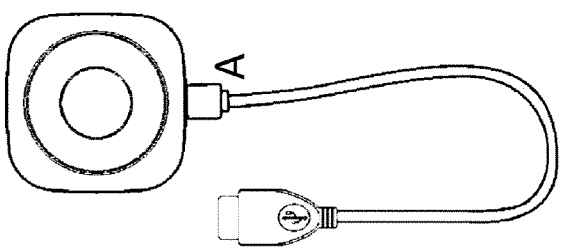
Figure 31:
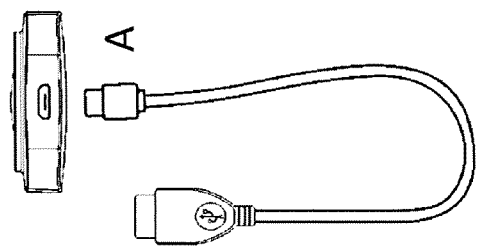

FIGS. 24, 25, 26, 27, 28 and 29 depict the female connector/USB interface convertor. FIG. 24 is a lower view, FIG. 25 is a top view, FIG. 26 is an upper view, FIG. 27 is a perspective view, FIG. 28 is a side view and FIG. 29 is a bottom view. There is a female operative end/USB output operative end 150, an actuation button 152 and input operative end 154.

FIGS. 30, 31, 32, 33 and 34 depict the female connector/USB interface convertor with input and output cables. A is used to designate the input operative end 158 a detachable cable. B is the female operative end/output operative end 156.

Figure 35:
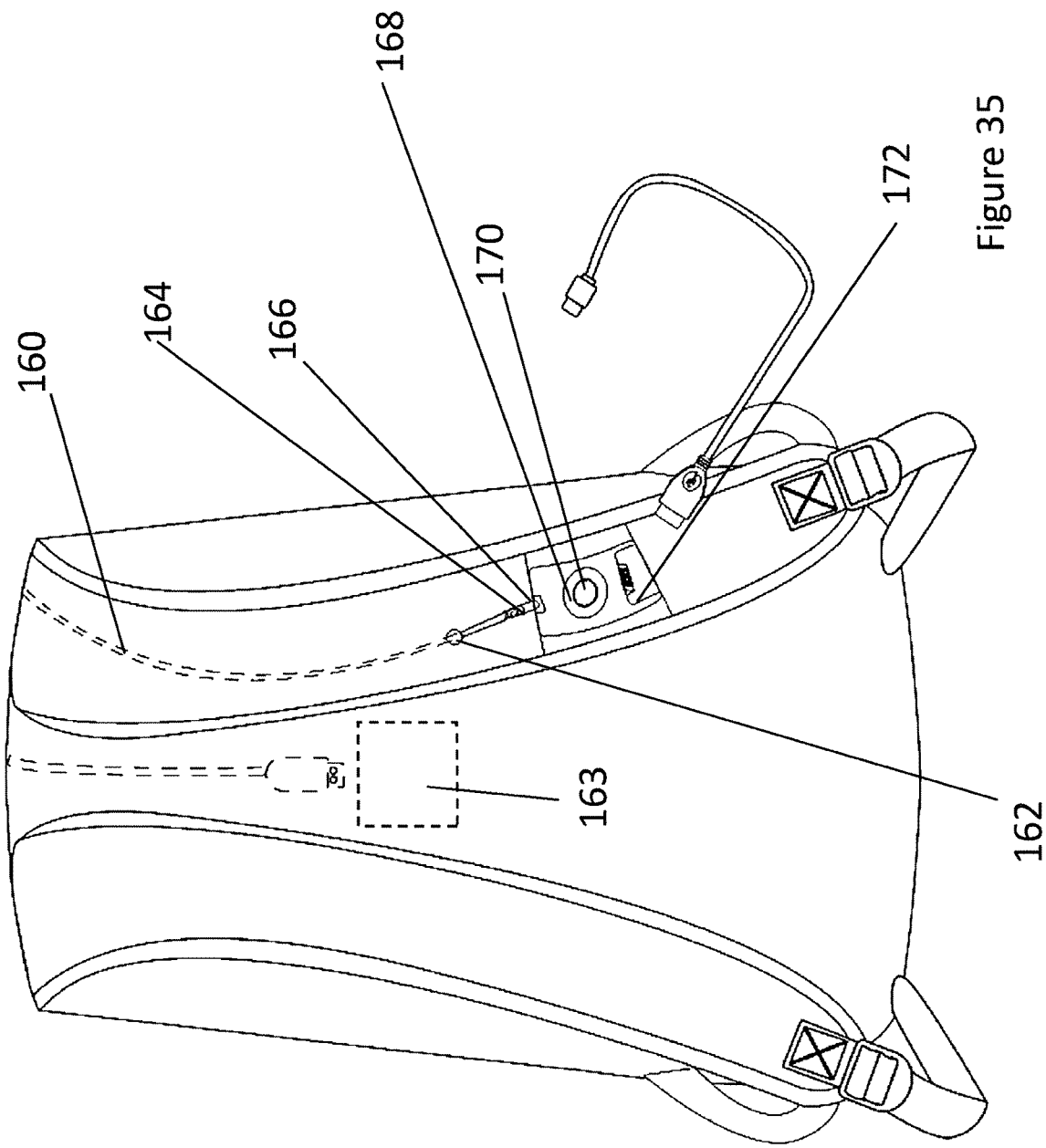

FIG. 35 depicts the body is provided with a cable laying channel 160 from a power storage device placing space to the opening between the inner surface and the outer surface of the body for penetration of the USB extension cable. The fourth opening 162 is on the body adjacent to the sheath to remove and place the wireless charger inside of the sheath. This embodiment also the fourth opening 162 at the end of the cable laying channel 160 to keep the cord end 164 outside of the channel. The raised portion of the sheath has a first open end 166, a second open end 172 and a surrounding bottom portion surrounding at least a portion of the raised portion, and at least a portion extends above an outer surface of a body. The raised portion receives a female connector having an output operative end, an input operative end and a detachable cord connecting between the input operative end and a battery inside of the body. The output operative end of the female connector is retained in the second open end 172 of the raised portion and the input operative end is retained in the first open end 166 of the sheath to provide the female connector in a flat position with the operative ends being operable and above the outer surface of the body, wherein the surrounding bottom portion is attached to a portion of the body, wherein one of the sides of the female connector has an actuation button. The third opening 168 surrounds the actuation button 170.

Figure 36:
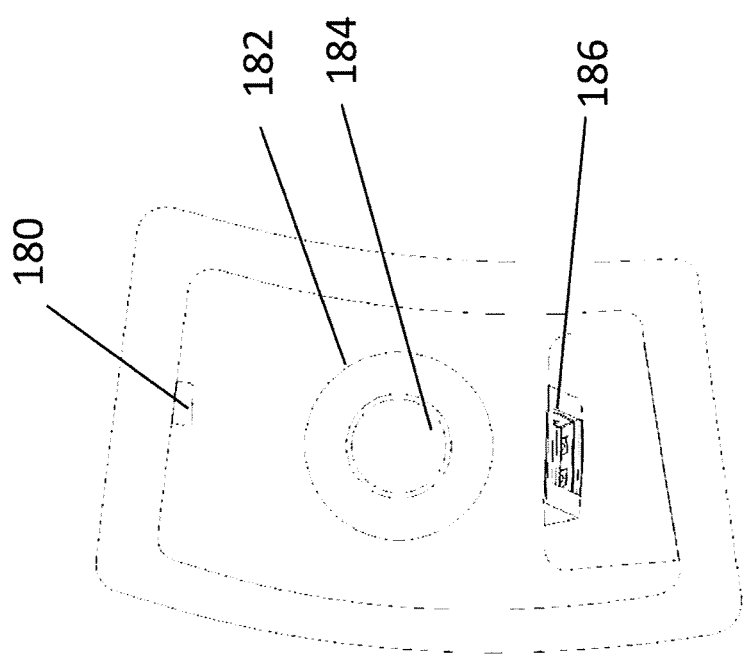

The body is provided with a cable laying channel 160 from a power storage device 163 placing space to a fourth opening 162 adjacent to the sheath and leaving the cord end 164 outside of the cable laying channel 160. FIG. 36 depicts a sheath with a first open end 180, third opening 182, actuation button 184 and output operative end 186. FIG. 36 depicts that the substantially rectangular raised portion may have a slight curve. This is particularly useful for shoulder straps the contour comfortably to the shoulders and chest of the user.

Figure 37:
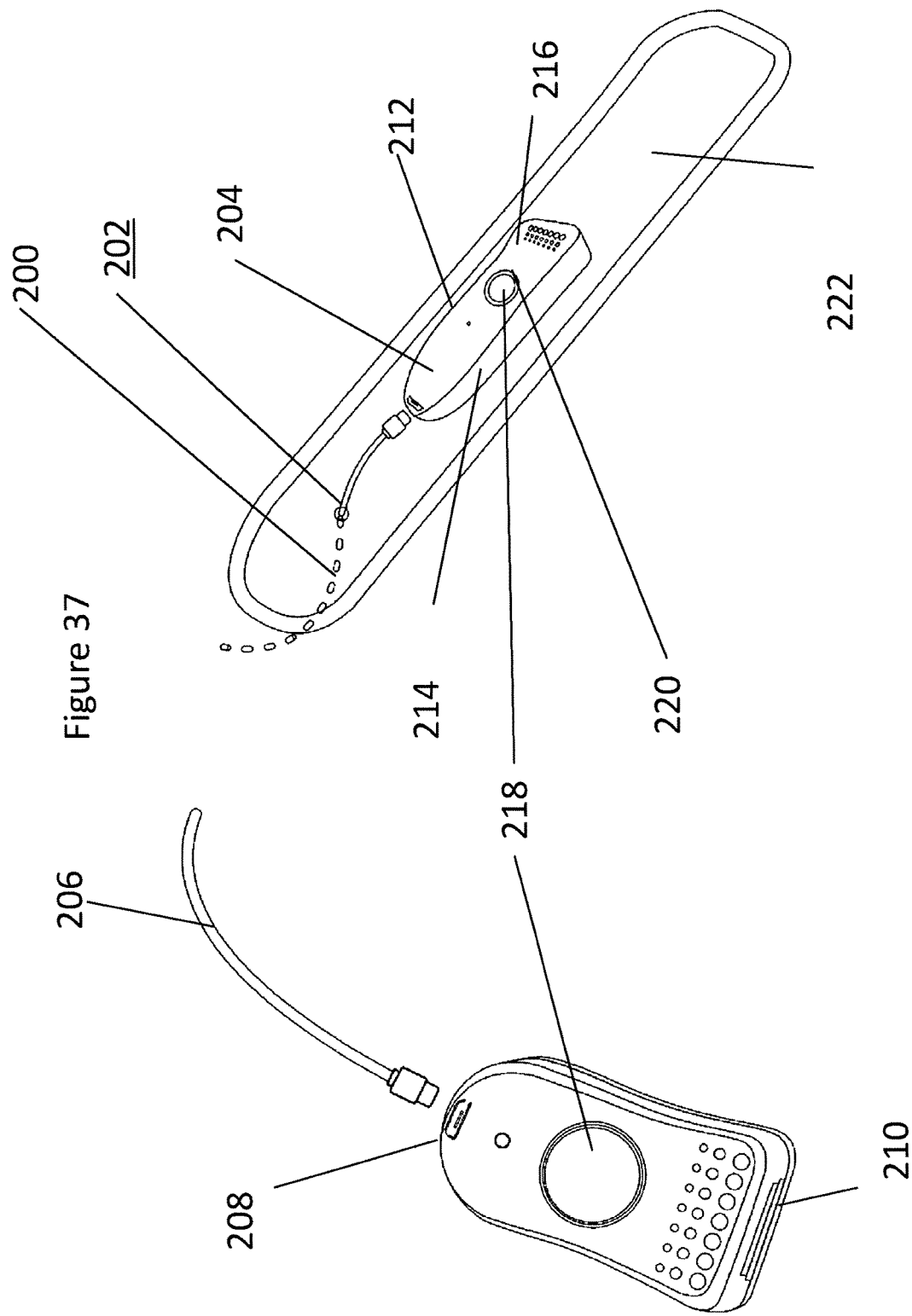
Figure 38:
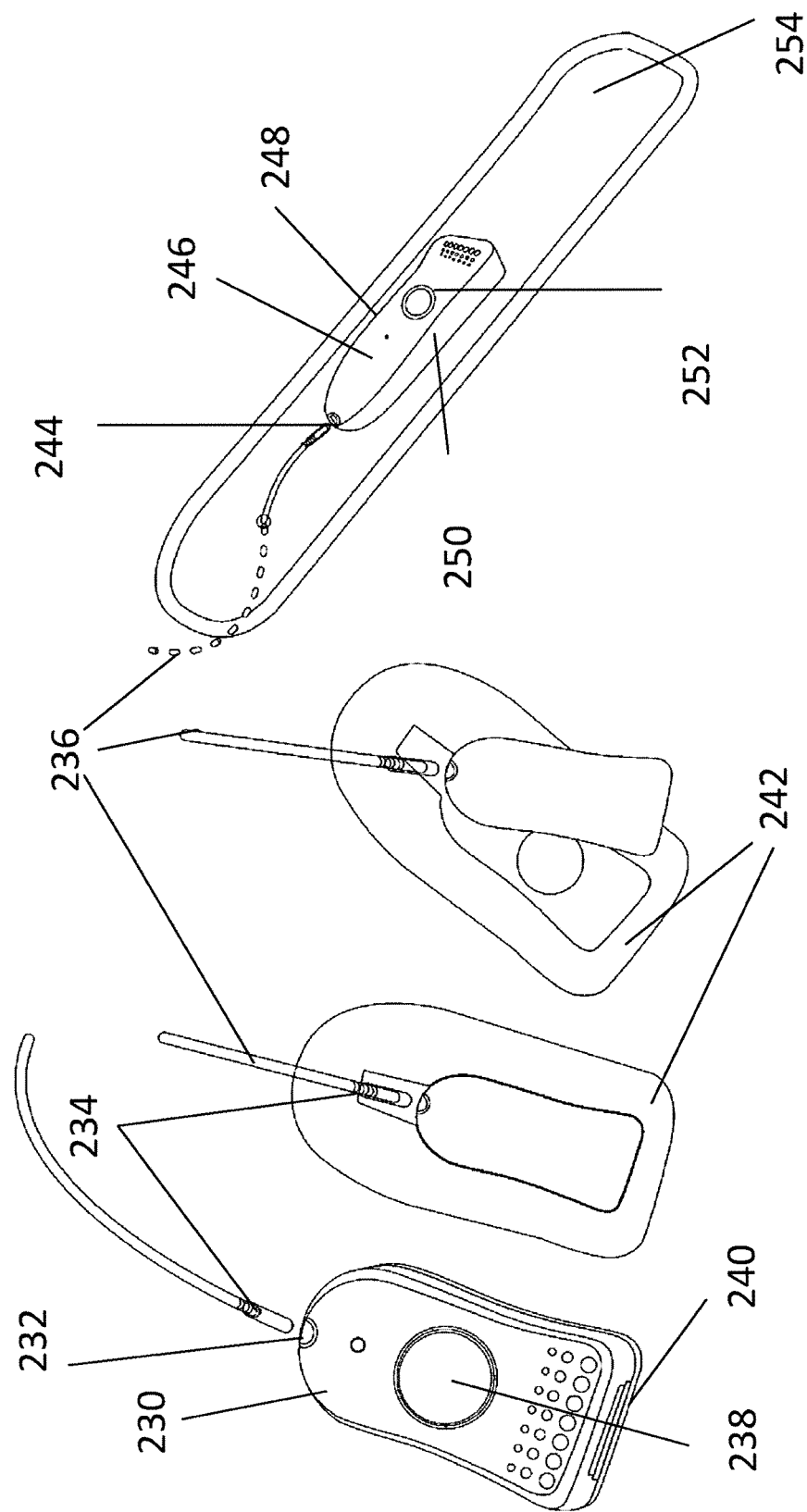
Figure 57:
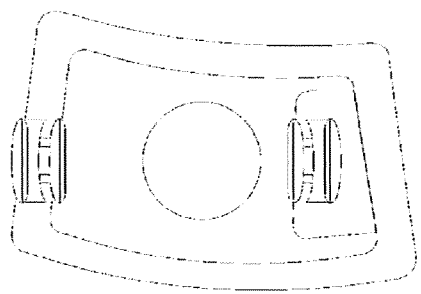
Figure 56:
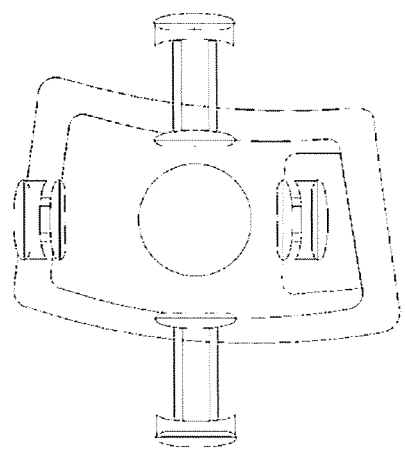

FIG. 37 depicts the body is provided with a cable laying channel 200 from a power storage device placing space to a fourth opening 202 adjacent to the sheath 204 having a left side 214, right side 212, top side 216, outer surface of a body 222, third opening 220, actuation button 218 and leaving the cord end 206 outside of the cable laying channel 200. The cord end 206 may detachably connected to the input operative end 208 of the female connector which is opposite the output operative end 210. FIG. 38 depicts the female connector 230, input operative end 232, cord end 234, cord 236, actuation button 238, second open end 240, surrounding bottom portion 242, first open end 244, top side 246, right side 248, left side 250, third opening 252 and outer surface of body 254.

FIGS. 39 and 40 depict that the inside surface of the sheath further comprises at least one limit point 260 to maintain the female connector to stay tightly in place. The limit point also prevents the USB cable from being pulled or dislodged during use.

FIGS. 41, 42, 43, 44, 45, 46, 47, 48, 119, 120, 121, 122, 123 and 124 depict difference examples of a body. This is by limitation only and intended to depict that the sheath is intended to be attached to many different types of body that can be worn or carried by a user. FIG. 41 depicts a sheath 3500 on gloves 3502. FIG. 42 depicts a sheath 3600 on a jacket 3602. FIG. 43 depicts a sheath 3700 on socks 3702. FIG. 44 depicts a sheath 3800 on a hat 3802. FIG. 45 depicts a sheath 3900 on glasses 3902. FIG. 46 depicts a sheath 4000 on goggles 4002. FIG. 47 depicts a sheath 4100 on sneakers 4102. FIG. 48 depicts a sheath 4200 on a belt 4202. The sheath as may have a bottom side with an opening 83 to allow the female connector to sit in the raised portion and the cord of the USB to go through the bottom side opening. A cover may extend above a shoulder strap and holds the actuation device in a first opening that aligns with a power output port and a second opening that aligns with the actuation button and having a recessed portion. The bottom side of the raised portion may have a bottom side opening to allow the female connector of the USB cable to sit in the sheath and the cord of the USB to go through the bottom side opening. There may be a cover that extends above a shoulder strap and holds the actuation device in a first opening that aligns with a power output port and a second opening that aligns with the actuation button and having a recessed portion.

According to another aspect of the present invention, wireless charging in envisioned. This differs from the previously described embodiments in that the device to be charged is not plugged into a USB extension cord, but rather is wirelessly charged by contact with a wireless charging pad. FIGS. 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 90, 91, 92, 93, 94, 95, 96, 97, 98, 99, 100, 101, 102, 103, 104, 105, 106, 107, 108, 109, 110, 111, 112, 113A, 113B, 113C, 114A, 114B, 115A, 115B, 116A, 116B, 117A, 117B, 118A, 118B, 119, 120, 121, 122, 123, and 124 depict wireless charging embodiments according to the present invention.

Figure 63:
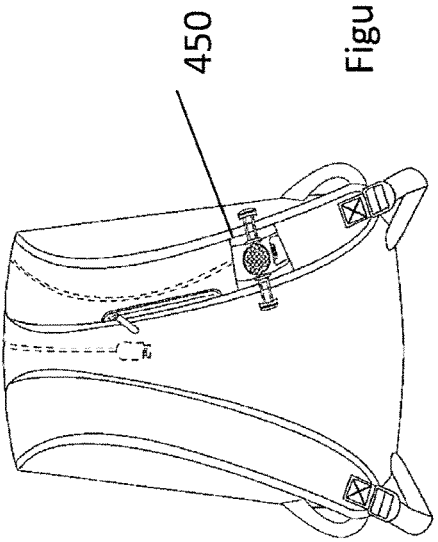

A sheath for convenient charging, comprising: a raised portion with a fixed holder 360 for mobile phone and a bottom portion 362, and at least a portion of the bottom portion communicating with a body, wherein the fixed holder for mobile phone is extends above a surface of a body, and adjustable to tightly hold different sizes, different shape of mobile phone, wherein the sheath has an opening 364, the rear side 366 of raised portion receives a wireless charger 412, and the wireless charger stays inside of the raised portion, and can be removed from the opening of the sheath, wherein the raised portion and the fixed holder are positioned to make the wireless charger and mobile phone communicate with each other. This provides a stable position for a mobile phone or other device to charge wirelessly on the outer surface of the body. The rear side of raised portion receiving the wireless charger further comprises at least one adjustable limit point, to hold the wireless charger stay in place (See FIGS. 58 and 59 for limit points 408. The adjustable limit points 408 hold the wireless charger 412 in opening 410. FIG. 63 depicts the wireless charger on the shoulder strap 450.

The holder for mobile phone may have vacuum suctions 400 to hold a device to be charged (e.g. a phone, music player, etc.), an adjustable gripper 402, elastic band 404, woven strip 404, a regular pocket 407, band with fasteners 406. The surface of the body may be inside of a bag pocket 9305, see FIG. 99.

Figure 92:
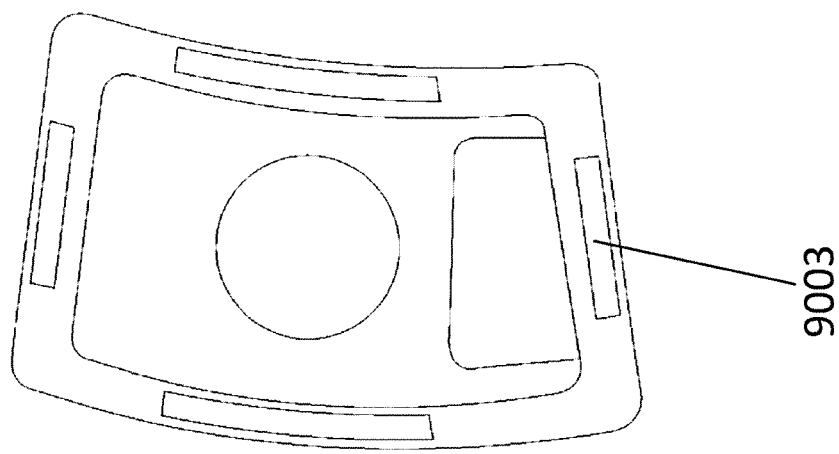
Figure 91:
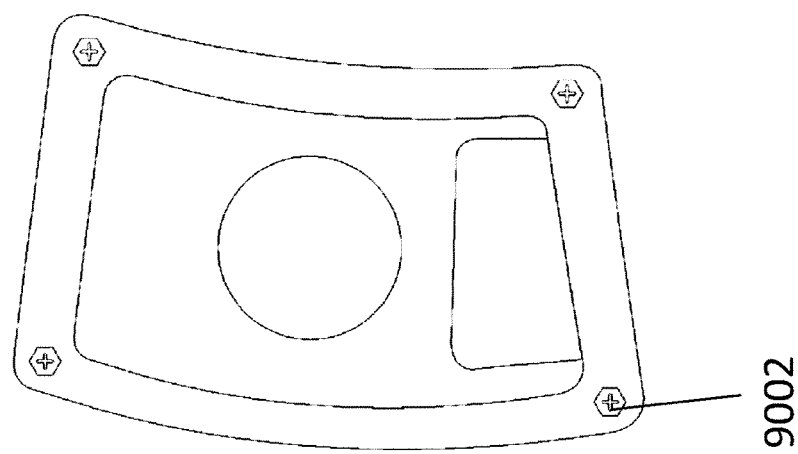
Figure 90:
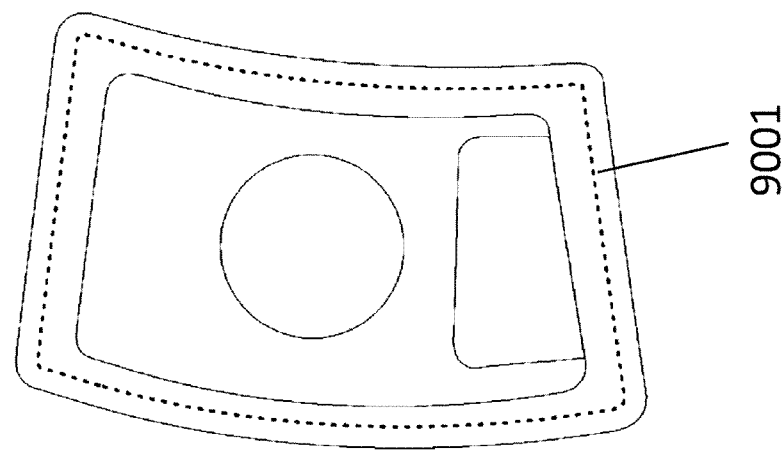

FIGS. 90, 91 and 92 depicts the bottom portion of the sheath communicates with the body by an attachment means attaching the sheath to the body, wherein the attachment means is selected from the group consisting of stitching 9001, glue 9003, rivet 9002, screw 9002.

Figure 55:
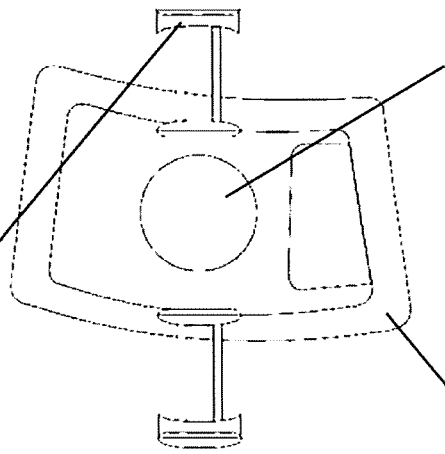
Figure 54:
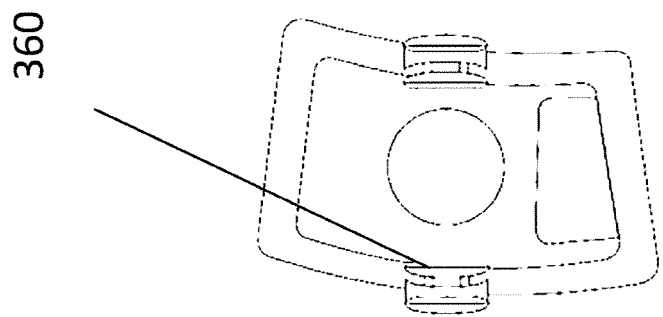
Figure 62:
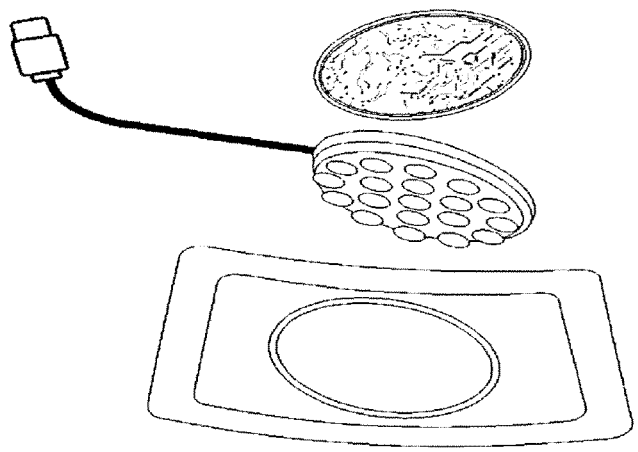
Figure 61:
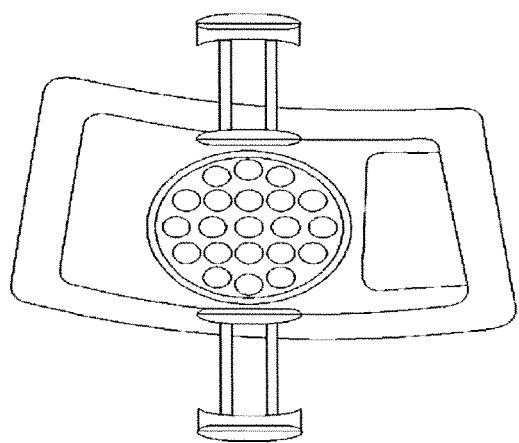
Figure 60:
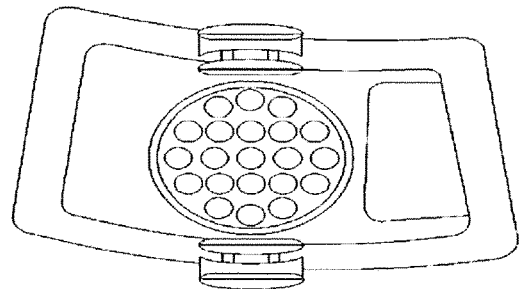
Figure 93:
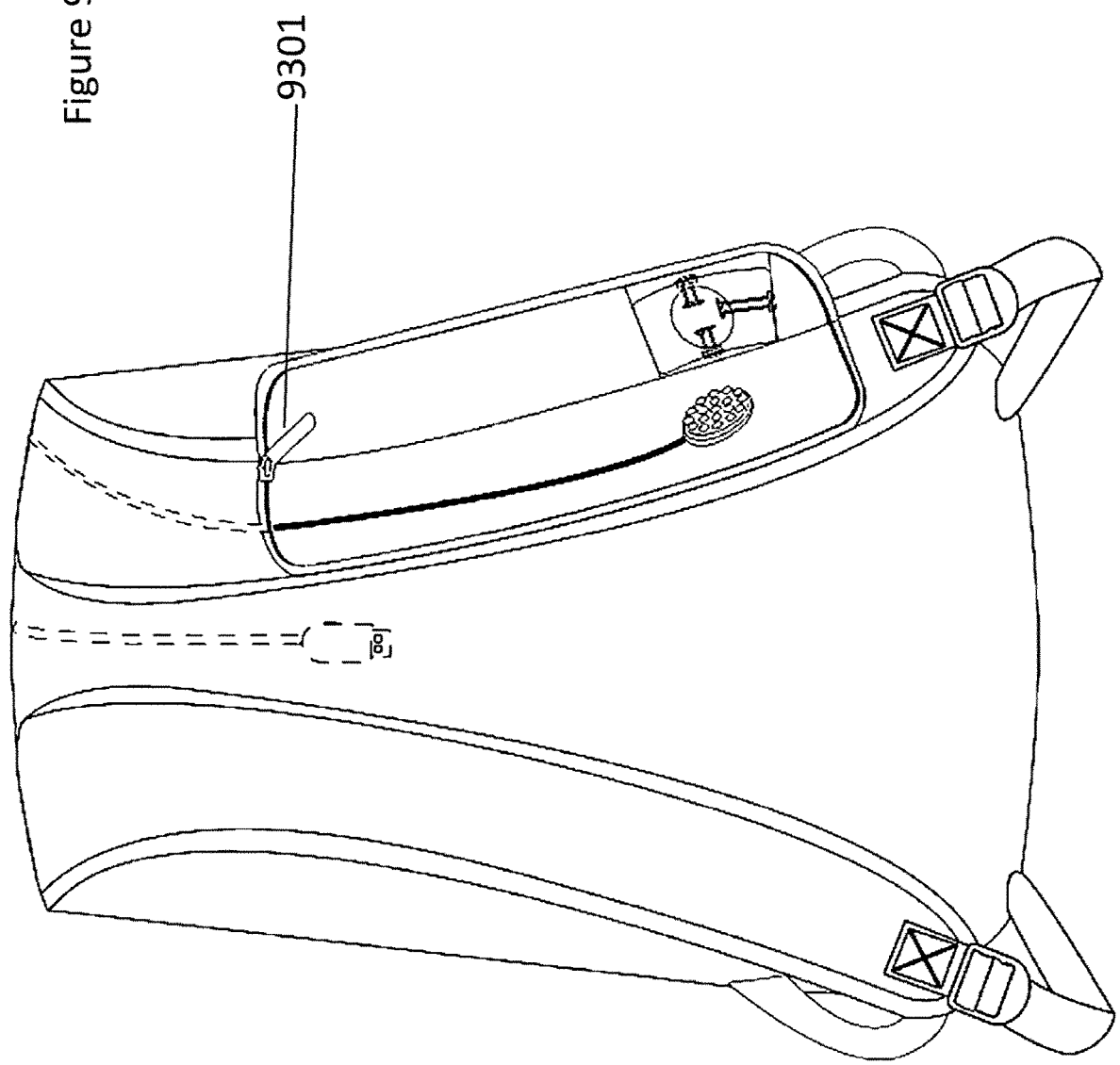
Figure 98:
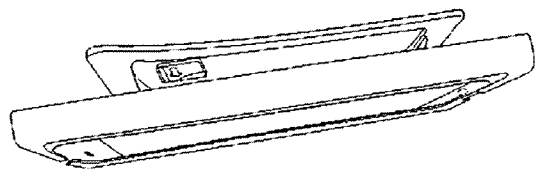
Figure 97:
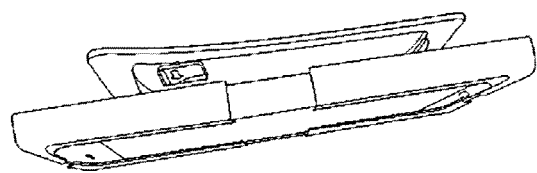
Figure 96:
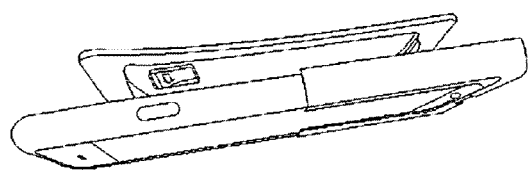
Figure 95:
Figure 94:
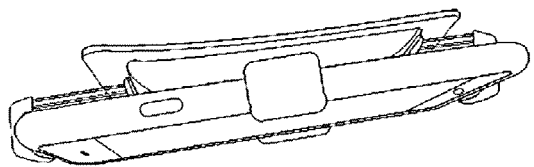
Figure 99:
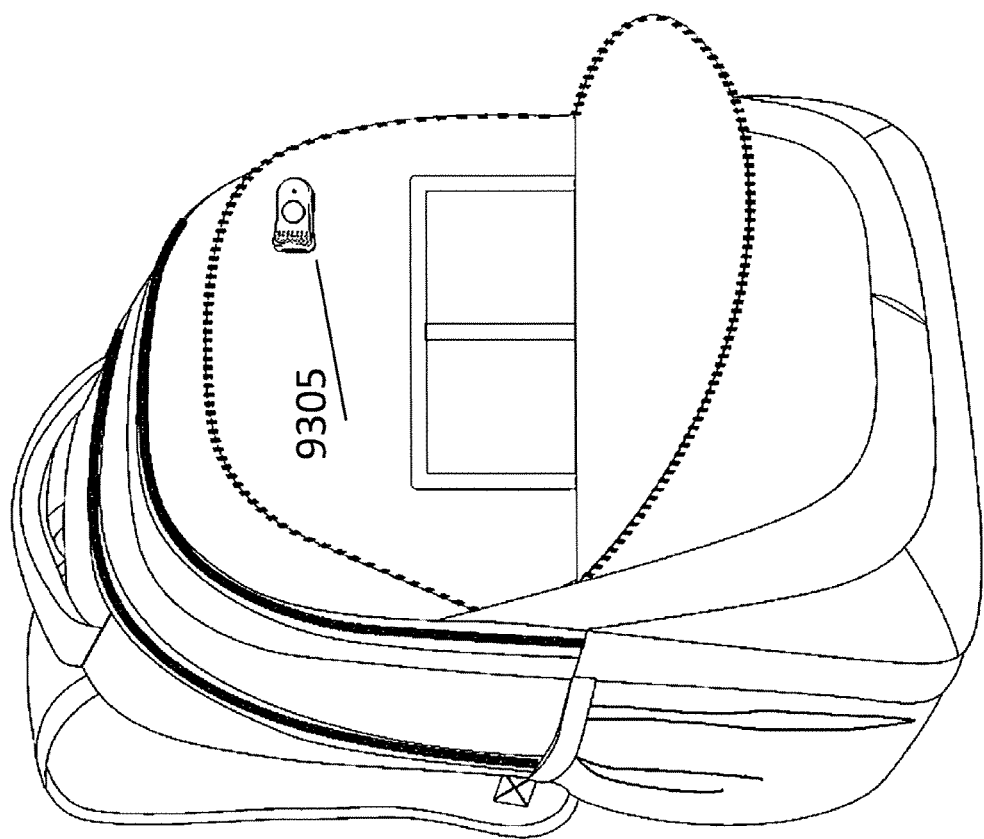

FIG. 55 depicts the raised portion further comprises a fifth opening 364, the wireless charger and mobile phone in wireless communication with each other. FIG. 93 depicts a fourth opening 9301 is on the body adjacent to the sheath to remove and place the wireless charger inside of the sheath.

FIGS. 64, 65, and 66 depict a sheath for convenient charging, comprising: a raised portion with a second open end 500, and a bottom portion 502, a power storage space in the body, and a magnet component 504, a USB cable having a female connector with an operative end, wherein the magnet component is configured to receive a mobile phone wireless charging holder which has a magnetic adjustable component 504, wherein at least a portion of the bottom portion is in communication with a body 506, wherein, at least a portion of the sheath extends above a surface of a body, wherein the operative end of the female connector is retained in the second open end 500 of the raised portion to provide the female connector of the UBS cable in a firm and flat position with the operative end of the female connector being operable and above the surface of the body, wherein an exit on the body is adjacent to the sheath for the cable going through, which connects the female connector in the sheath to a power storage space in the body, wherein the mobile phone wireless charger connects to the operative end of the female connector. The device may have a magnet 508 to retain the device for wireless charging.

Figure 68:
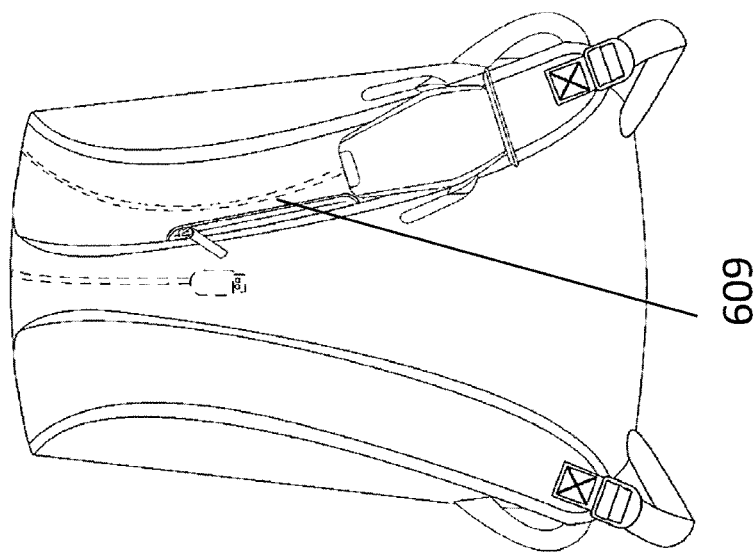
Figure 67:
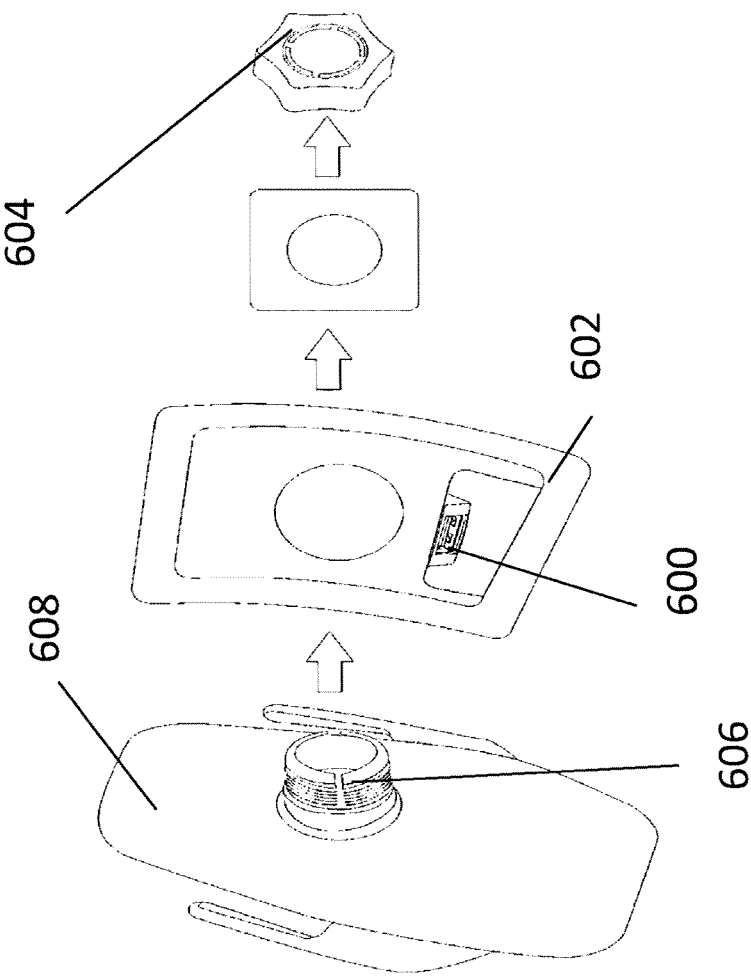
Figure 85:
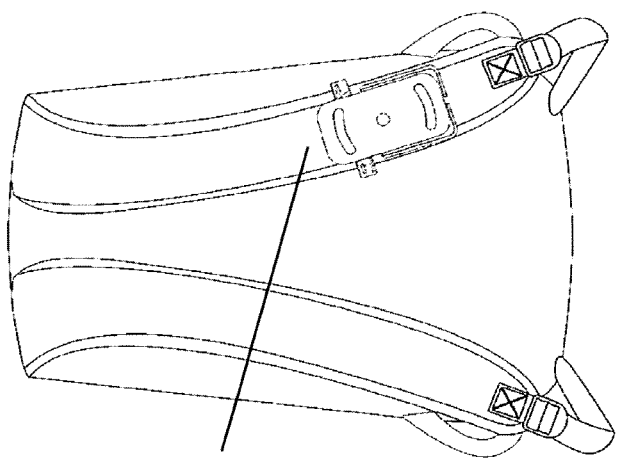
Figure 80:
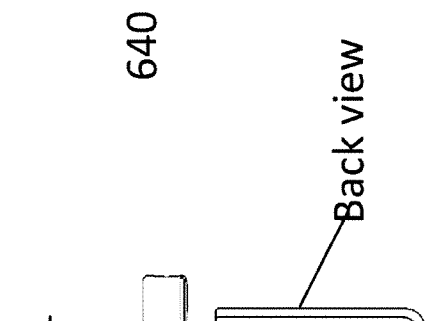
Figure 81:
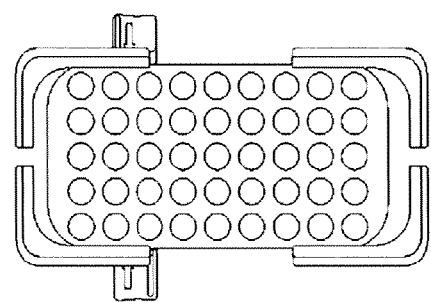
Figure 82:
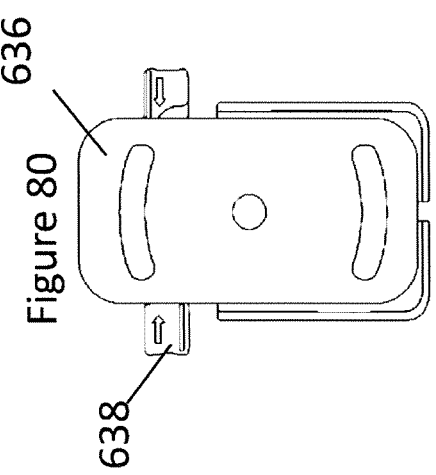
Figure 83:
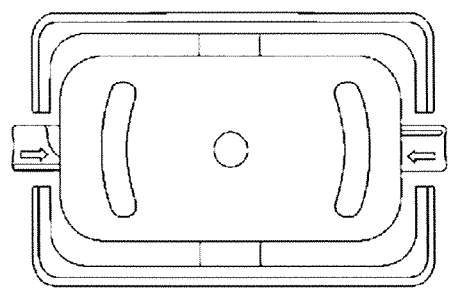
Figure 84:
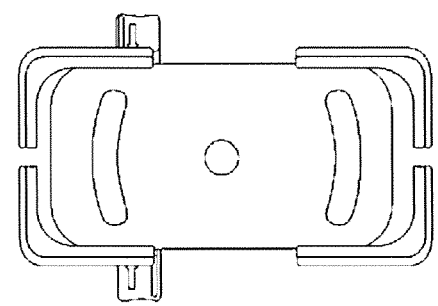

According to another embodiment, the device for wireless charging may be retained by a universal adaptation nut, as depicted in FIGS. 67 and 68, depicting a sheath for convenient charging, having a raised portion with a second open end 600, a bottom portion 602, a power storage space in a body, and a universal adaptation nut 604 and 606, wherein the universal adaptation nut is configured to receive a mobile phone wireless charging holder 608. It should be noted that the wireless charging holder may be purchased by the user and is apart from the sheath, the universal adaption nut is configured to receive any such wireless charging holder. At least a portion of the bottom portion is in communication with the body, at least a portion of the sheath extends above a surface of the body, the operative end of a female connector is retained in the second open end 600 of the raised portion to provide the female connector of the UBS cable in a firm and flat position with the operative end of the female connector being operable and above the surface of the body, an exit on the body is adjacent to the sheath for the cable 609 going through, which connects the female connector in the sheath to a power storage space in the body, the mobile phone wireless charger connects to the operative end 610 of the female connector.

A sheath for convenient charging, comprising: a raised portion with a fixed adjustable mobile phone holder and a bottom portion, wherein the fixed adjustable mobile phone holder is adjustable to tightly hold different sizes, different shape of mobile phone, wherein the raised portion contains wireless charging components that are fixed inside of the sheath, wherein the sheath is on a body with a cable laying channel going from the sheath to a power storage space in the body, wherein at least a portion of the bottom portion is in communication with the body, wherein the raised portion and the fixed holder are attached to make the wireless charger and mobile phone is communication with each other, providing a stable position for a mobile phone charging by a wireless charger on the outer surface of the body.

FIGS. 71, 72, 73 and 74 depict an example of an adjustable mobile phone holder with an extendable left arm 620 and extendable right arm 622. The raised portion has a rear side that receives the wireless charger 624 and has an opening 626 to remove the wireless charger and allow for wireless charging. FIGS. 75 and 76 depict a different example of an adjustable mobile phone holder. There is a left portion 628 and a right portion 630 with at least one connecting bar 632 that allows the distance between the left portion 628 and right portion 630 to be adjusted to accommodate different sized devices. The at least one connecting bar 632 may act to attach the sheath to the body. The raised portion may further comprises a fifth opening 626, the wireless charger and mobile phone in communication with each other.

FIGS. 80, 81, 82, 83, 84, 85, 94, 95, 96, 97 and 98 depict a sheath 636 for convenient charging, comprising: a raised portion with a fixed holder 638 for mobile phone and wireless charger, wherein the fixed holder is adjustable to tightly hold the both mobile phone and wireless charger in different sizes, different shapes, wherein at least a portion of the sheath is firmly attached on a body, and at least a portion of the holder extends above an outer surface of the body 640, wherein the raised portion with a fixed holder is attached to provide the wireless charger and the mobile phone in communication with each other, providing a stable position for a mobile phone charging by a wireless charger on the outer surface of the body. As discussed above, an adjustable fixed holder is intended to retain a device in a position such that it can be wirelessly charged by a wireless charger that is retained inside the raised portion. Retaining the phone can take many forms such as vacuum suction, adjustable gripper, elastic band, woven strip and band with fasteners. The bottom portion of sheath is in communication with the body by an attachment means, wherein the attachment means is selected from the group consisting of stitching, glue, rivet and screw.

Figure 86:
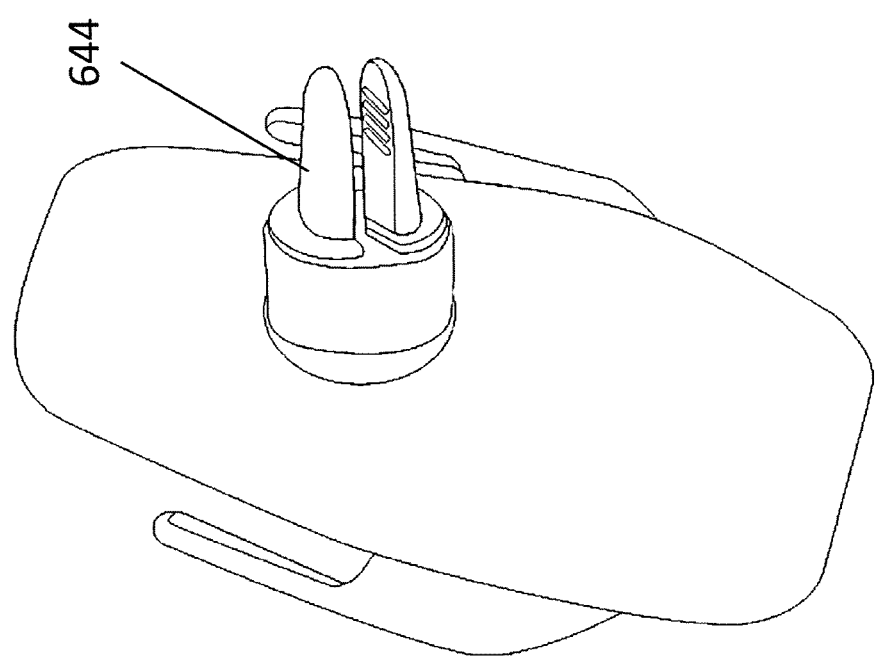
Figure 87:
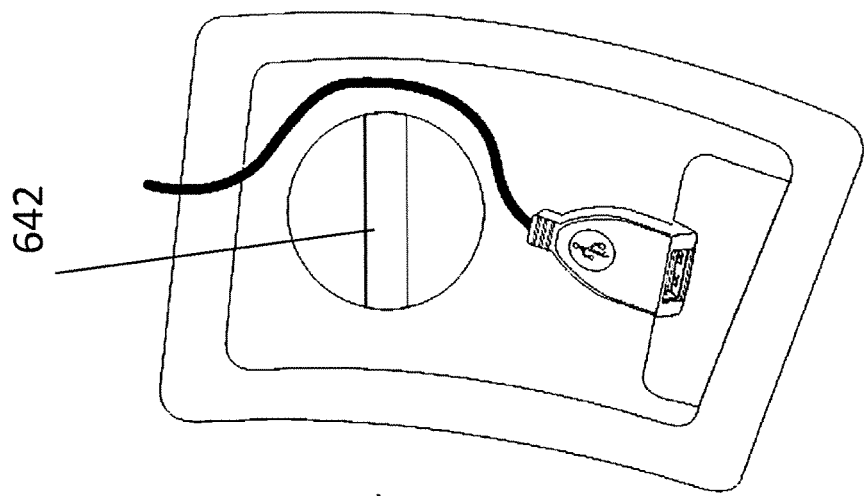

FIGS. 86 and 87 depict a sheath for convenient charging, comprising: a raised portion with a second open end, a bottom portion, a power storage space in a body, and a bracket 642 for fixing, wherein the bracket for fixing is configured to receive a mobile phone wireless charging holder (as shown above that bracket may be in the opening to get enough space to receive the clip on the wireless charger. The wireless charger may have a clip 644 that connects to the bracket 642 to retain the device in a proximity to the wireless charger to allow for charging. At least a portion of the bottom portion is in communication with the body, at least a portion of the sheath extends above a surface of the body, the operative end of a female connector is retained in the second open end of the raised portion to provide the female connector of the UBS cable in a firm and flat position with the operative end of the female connector being operable and above the surface of the body, an exit on the body is adjacent to the sheath for the cable going through, which connects the female connector in the sheath to a power storage space in the body, the mobile phone wireless charger connects to the operative end of the female connector. The bottom portion of the sheath is attached to the body by stitching, glue, rivet, screw.

There may be a second outer surface that covers the outer surface of the body. Similarly, the outer surface of the body may be the inside of a pocket. The outer surface onto which the sheath is mounted may have an additional cover or be on the inside of a pocket without departing from the present invention. The sheath may be attached to the body with the first tapered closed end above the second open end. Specially, the second open end is substantially parallel to the ground of the user. This is to say that the open end of the sheath faces the ground. This provides another level of dust and water protection to the operative end of the USB cable.

Figure 101:
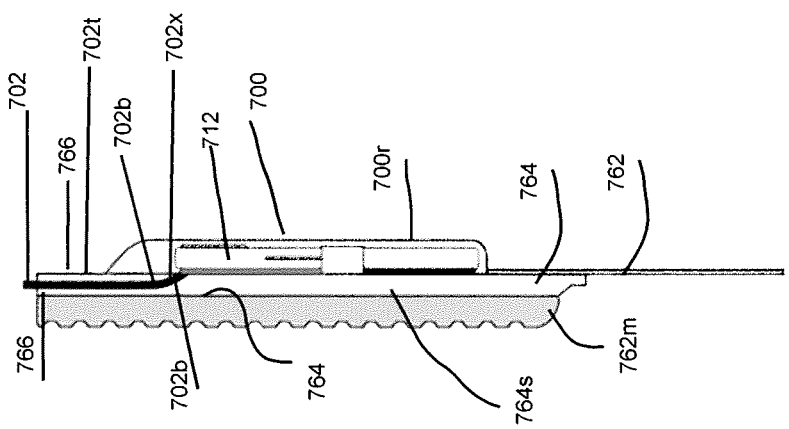
Figure 100:
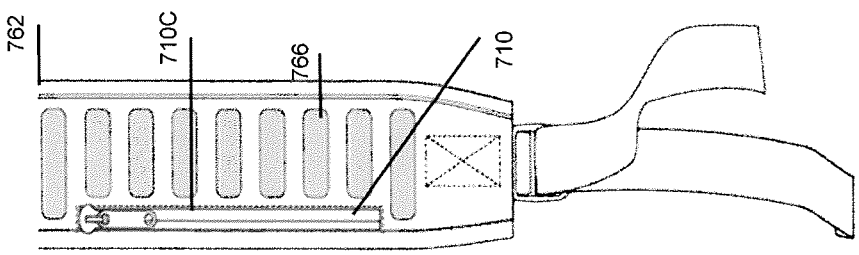

Referring now to FIG. 100 and the corresponding section view of FIG. 101, the body can be provided by the shoulder strap 762 or other part of a backpack or other luggage 1. As noted above, the luggage 1 can alternatively be provided as shown in FIGS. 119-124 respectively as a backpack, belt or fanny pack, messenger bag, tote bag, duffle bag, briefcase, or any other desired luggage. The wireless charging sheath 700 can be connected to the shoulder strap 762 as shown and described herein. Except as otherwise shown and/or described herein the shoulder strap 762 can be the same as the shoulder strap 62 described above. The shoulder strap 762 or other body can include outer surfaces 766 and can include inner surfaces 764 that define an internal space 764s for receiving a wireless charging device or "wireless charger" 712. The wireless charger 712 can be installed, connected, and operated in a manner similar to the wireless charging device 412 described.

A charging cable 702 (sometimes shown in broken lines when it is hidden within a structure) includes a wireless charging end 702b that is operatively connected to the wireless charger 712 to provide electrical power from the battery 65 or other source located in the power storage space 67 of the luggage body 1. The charging cable 702 also includes an input operative end 702a that is connected the battery 65 (see also FIGS. 106 & 107). Between its power input end 702a and its wireless charging end 702b, at least part of the charging cable 702 extends through a passage or tunnel 702t. Part of the tunnel 702t can be located inside the shoulder strap 762 and be defined by the internal space 764s between the inner surfaces 764 of the shoulder strap 762. The tunnel 702t can include an interior exit 702e (FIG. 107) for the cable 702 to extend out of the tunnel 702t and extend to the power storage space 67 to connect with the battery 65. Additionally or alternatively, part of cable 702 can be located external to the strap 762 such as by extending along the outer surfaces 766 of the strap 762.

Like the devices described above, the sheath 700 provided as part of the shoulder strap 762 can comprise a raised portion 700r in which the wireless charger 712 is located and contained in a fixed position. The raised portion can be manufactured from one material or a combination of materials selected from a the group consisting of fabric, film, plastic, metal, rubber, silicon. As shown in FIG. 100 and also FIG. 103, the strap 762 can comprise a second exit or access opening 710 (also referred to above as a "fourth opening" such as the fourth opening 68 of FIG. 12 and the fourth opening 9301 of FIG. 93 that provides access to the internal space 764s for selective installation and removal of the wireless charger 712 into or from the internal space 764s. The second exit access opening 710 can comprise an optional re-closable closure device 710c such as the illustrated zipper, a VELCRO® brand or similar hook-and-loop fastening element, one or more snaps, one or more buttons, one or more clips or clamps, one or more magnetic fasteners, one or more adhesive strips or tape, and/or any other suitable closure device(s) that allows the access opening 710 to be selectively closed (FIGS. 100 & 104 and reopened (FIGS. 103 & 105) as needed to insert or remove the wireless charging device 712 relative to the internal space 764s.

In the section view of FIG. 101, it can be seen that the cable 702 can extend through the tunnel 702t and the wireless charging end 702b exits the tunnel 702t through a first exit opening 702x and connects with the wireless charger 712 that is located in the raised portion 700r to provide electrical power to the wireless charger 712 from the battery 65.

Figure 102:
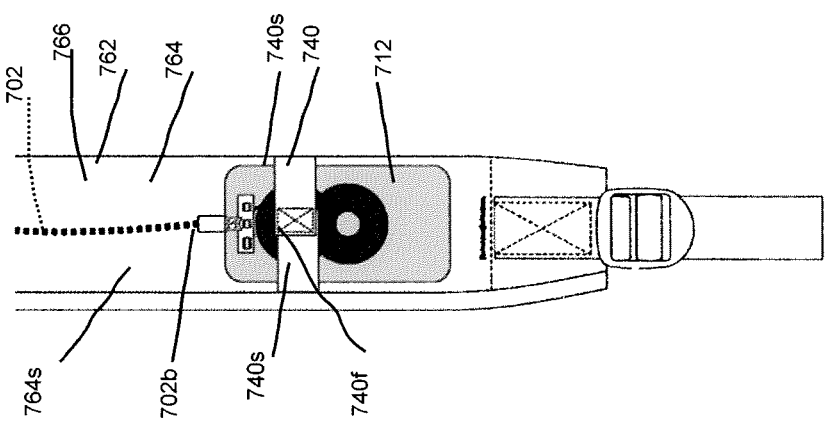

In FIG. 102, an outer surface 766 of the strap 762 is partially removed to reveal the internal space 764s and the wireless charger 712 operatively located in the space 764s. The sheath 700 further comprises a fixing device or fixing component 740 located within the internal space 764s for operatively securing the wireless charger 712 in a select operative position within the space 764s, such as within the raised portion 700r so that the wireless charger 712 is firmly and immovably secured in its operative position for being wirelessly mated or coupled with an associated mobile phone or other mobile device M (see FIGS. 112A, 112B, 112C) for electrically charging the associated mobile device M in a wireless manner from the wireless charger 712.

In the non-limiting example of FIG. 102, the fixing component 740 can comprise at least one elastic or inelastic band or strap or a pair of elastic straps/bands 740s that can include a VELCRO® brand or similar hook-and-loop fastening element 740f or another type of fastening element 740f such as one or more buttons, one or more clips or clamps, one or more snaps or buttons, one or more magnetic fasteners, one or more adhesive strips, and/or any other suitable closure device(s), or the fixing component 740 can be provided as one or more elastic straps without a fastening element that can stretch to accommodate and receive the wireless charging device 712 to firmly hold the wireless charging device 712 in a desired operative position inside the internal space 764s of the strap.

Figure 103:
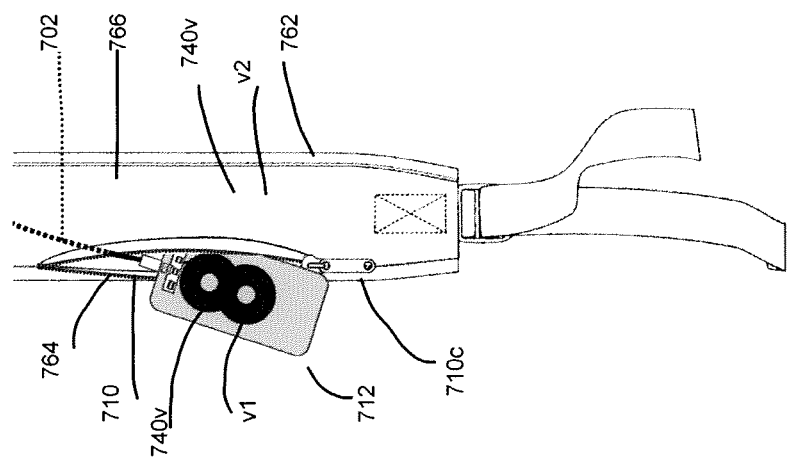

FIG. 103 provides another example where it can be seen that the fixing component comprises a VELCRO® brand or similar hook-and-loop fastening element 740v comprising a first fastening component V1 (one of the hook component or the loop component) adhered or otherwise connected to the wireless charging device 712 and a second fastening component V2 (the other of the hook component or the loop component) sewn or adhered or otherwise secured to one of the inner surfaces 764 of the strap 762 so as to be located within the space 764s. As such, when the first and second fastening components V1,V2 are contacted and mated, the wireless charging device 712 is releasably and firmly held in its operative position within the space 764s of the strap 762 or other location of the luggage body 1.

FIGS. 100 & 101 also show that the strap 762 can comprise a resilient soft foam material or padding 762m connected to and located on the outer surface 766 that is oriented toward a user's body to improve the user's comfort when wearing the backpack or other luggage to which the strap 762 is connected. The padding 762m can be located so as to be aligned with the wireless charging device 712 so as to be located between the user's body and the wireless charging device 712 when the user is wearing the backpack or carrying other luggage to which the strap 762 is connected.

Figure 107:
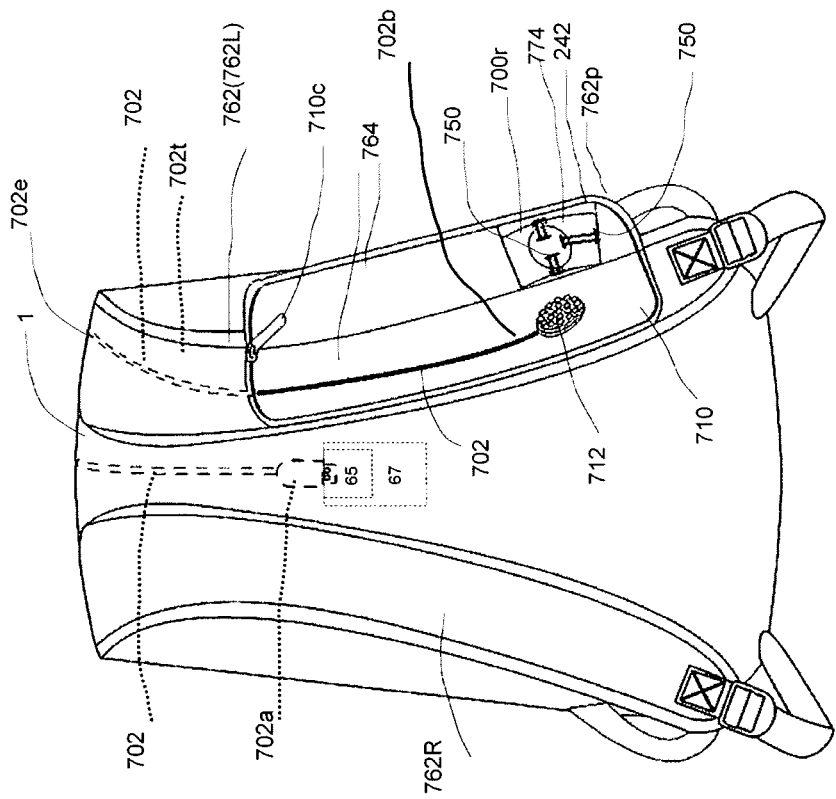
Figure 106:
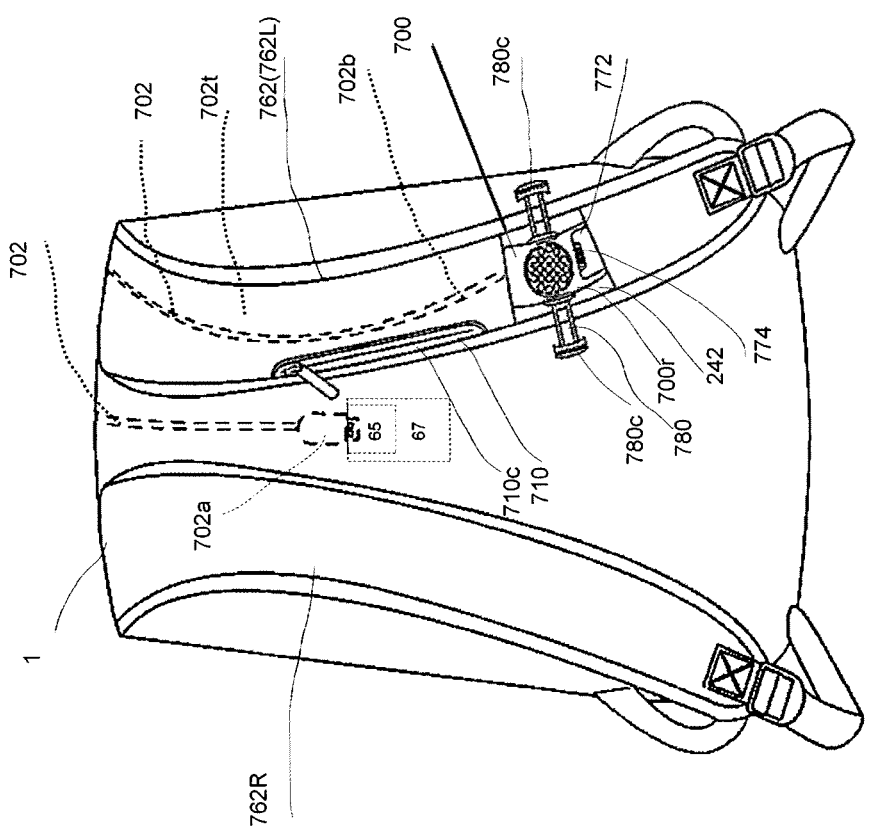

FIGS. 106 & 107 respectively show first and second examples of a luggage body 1, such as a backpack or other luggage body, including another example of a strap 762 and sheath 700 similar to that described above, wherein the wireless charging device 712 is shown in a different (circular) shape and the second exit/access opening 710 is shown in a different position. In FIG. 106, the closure device 710c of the second exit/access opening 710 is closed and the wireless charger 712 is accessible on the raised portion 700r. The sheath 700 included as part of the strap 762 can include a holding component 780 as part of the raised portion 700r of the sheath 700 such as any of the holding components described above including fixed and/or adjustable (movable) fingers 780c for engaging and retaining a mobile phone or other mobile device M in an operative position abutting the raised portion 700r adjacent the wireless charger 712 so that the wireless charger 712 wirelessly couples with and charges the associated mobile device M. The raised portion 700r can optionally also include the second open end 772 with a female connector 774 that can be mated with a conventional charging cable for charging the mobile phone or other mobile device M in a wired manner without connecting the mobile phone/device to the holding component 780. The raised portion 700r of the sheath can be surrounded by and connected to a bottom portion 242 that can be made from fabric that is sewn and/or otherwise attached to the inner surface 764 of the strap 762.

Although FIGS. 106 & 107 show that the wireless charging device 712 is operatively installed in the left strap 762L of the backpack, the wireless charging device 712 can alternatively be operatively installed in the right strap 762R of the backpack to increase a safety distance between the wireless charging device 712 and the heart of the user wearing the backpack 1 since the right strap 762R is spaced farther from the heart of a user wearing the backpack 1 as compared to the left strap 762L.

FIG. 107 shows a different shape and size of the second exit or access opening 710 and shows the closure device 710c in its opened configuration with a flap portion 762p of the strap 762 opened outwardly to an opened position provide access to the internal space 764s through the second exit/access opening 710. In FIG. 107, it can be seen that the sheath 700 can include a rear opening 774 in the raised portion 770r that receives the wireless charger 712 and can include at least one fixing component 750 such as one or more clips or clamps or other retainers that engage the wireless charger 712 and hold it in its operative position within the internal space 764s of the strap 762 such as installed in the rear opening 774 of the raised portion 700r of the sheath 700.

Figure 109:
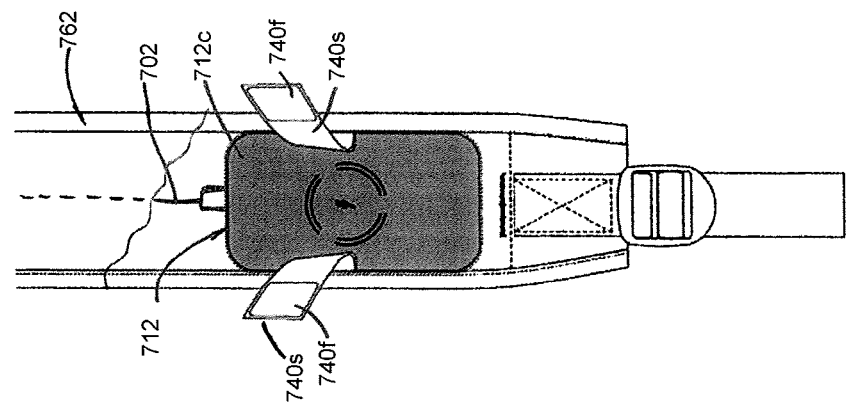
Figure 108:
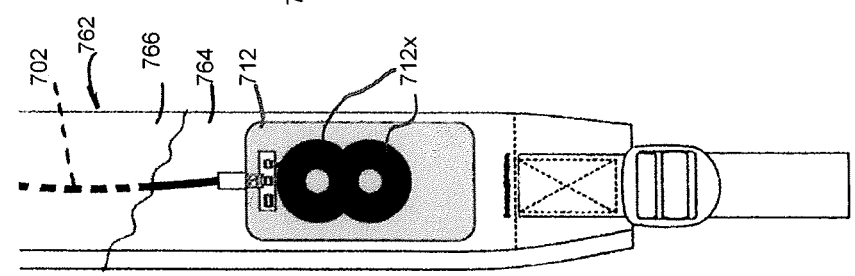

As shown in FIG. 108, wherein an outer surface 766 of the strap 762 is partially removed to reveal the internal space 764s and the wireless charger 712 operatively located in the space 764s, the wireless charging device 712 installed within the internal space 764s can include at least two charging contacts or charging coils 712x to ensure effective and continuous charging for a mobile phone/device M engaged with the sheath 700 and located adjacent the charging coils 712x. As shown in FIG. 109, which is similar to FIG. 108, the wireless charging device 712 can include a polymeric (plastic) or other substantially rigid cover 712c that covers the charging coils 712x and protects the coils 712x from breaking or burning or excessive heat. The fixing component 740 such as the straps 740s with VELCRO® brand or similar hook-and-loop fastening element 740f or other fastening elements such as one or more clips, clamps, snaps, buttons, adhesive strips or tap, and/or other fastening elements can be provided and used to secure the wireless charging device 712 (including the cover 712c) in its operative position within the internal space 764s of the strap 762 or other body.

Figure 110:
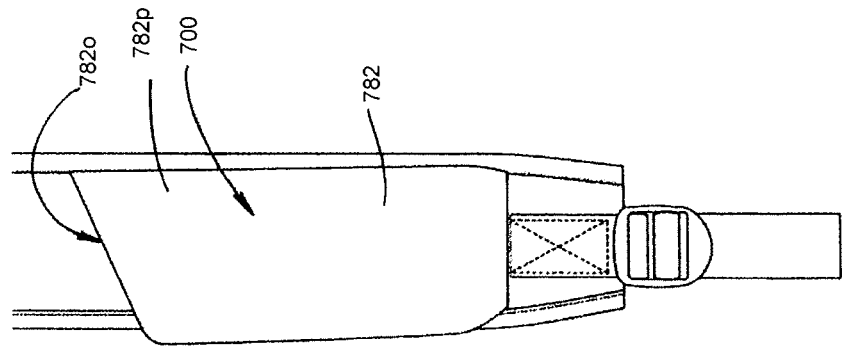

Referring now also to FIG. 110, the sheath 700 of the strap 762 or other body can further comprise a holding component 782 for holding a rechargeable mobile device such as the mobile phone M in an operative charging position adjacent the wireless charger 712 for being wirelessly charged. The holding component 782 can be part of the raised portion 700r of the sheath and/or can be connected to the raised portion 700r of the sheath. In the illustrated example of FIG. 110, the holding component 782 can comprise an elastic pocket 782p including an opening 782o into which the mobile device M can be inserted such that that elastic pocket 782p holds the mobile device M adjacent the wireless charging device 712 that is operatively installed within the internal space 764s of the strap 762 or other body.

FIG. 111 is similar to FIG. 110 but shows an alternative shape for the elastic pocket holding component 782p.

FIGS. 112A, 112B, 112C respectively illustrate first, second, and third alternative holding components 782A, 782B, 782C that each comprise one or more sections of elastic strap or elastic band 782e or a pair of elastic straps/bands 782e that cooperate to define an elastic pocket that receives and releasably retains the mobile phone M or other mobile device to be charged in a position adjacent the wireless charging device 712 located within the internal space 764s of the strap 762 or other body. The elastic pocket defined by the one or more elastic straps/bands 782e may include one or more fastening elements 782f such as a clip, clamp, VELCRO® brand or similar hook-and-loop fastening element, a magnetic fastener, a snap, a button, an adhesive strip, or any other suitable releasably fastening element that can be selectively unfastened to facilitate insertion and/or removal of the mobile device M into or out of the elastic pocket, or the elastic pocket can be sufficiently resilient such that the fastening element(s) 782f can be omitted.

Figure 113:
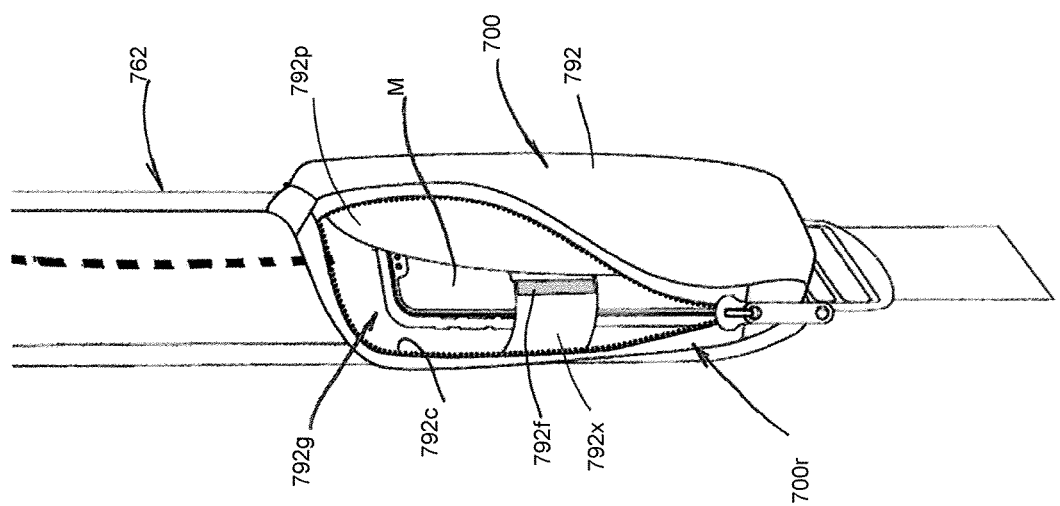

FIG. 113 shows a variation in which the holding components 782,782A-C of the raised portion 700r of the sheath 700 as described above are replaced by a holding component 792 for holding a rechargeable mobile device such as the mobile phone M in an operative charging position adjacent the wireless charger 712 for being wirelessly charged (the wireless charger 712 is not shown in FIG. 113 because it is located within the internal space 764s. In the illustrated example of FIG. 113, the holding component 792 can comprise an tight pocket 792p that closely received the mobile phone/device M and that includes a reclosable pocket opening 792g including a pocket closure device 792c such as the illustrated zipper or another suitable closure device such as one or more snaps, clips, clamps, buttons, strips, adhesive tape, a VELCRO® brand or similar hook-and-loop fastening element or any other closure device 792c that can be repeatedly engaged and disengaged to provide selective access to the inside of the pocket 792p via opening 792g for insertion and removal of the mobile phone/device M. In one example, the pocket 792p is sufficiently tight such that a mobile phone/device M inserted/contained therein is held adjacent the wireless charger 712 (not visible in FIG. 114) for wireless charging to occur without requiring any additional holding device. In another example, as shown, an optional fixed length or resilient strap or band or other securement system 792x (with or without a fastening element 792f) is located within the pocket 792p and is configured to receive and retain the mobile phone/device M in an operative position as shown where the mobile device M is located adjacent the wireless charger 712 for effective charging. The inclusion of a releasable fastening element 792f of the securement system 792x can facilitate insertion and removable of the mobile phone or other device M relative to the pocket 792p. As described above, examples of suitable fastening elements 792f include but are not limited to a clip, clamp, VELCRO® brand or similar hook-and-loop fastening element, a magnetic fastener, a snap, a button, an adhesive strip, or any other suitable releasably fastening element that can be selectively unfastened to facilitate insertion and/or removal of the mobile phone or other device M.

FIGS. 114A and 115A are each similar to FIG. 113 but show respective alternative configurations or structures for the holding component 792 of the raised portion 700r of the sheath 700 for holding the mobile phone/device M adjacent the wireless charger 712 carried by the strap 762. In particular, the pocket 792p and the optional strap securement system 792x located within in the pocket 792p are different as compared to FIG. 113. FIGS. 114B and 115B respectively correspond to FIGS. 114A and 115A but show the pocket closure device 792c configured in its closed configuration to close the pocket opening 792g.

Figure 116B:
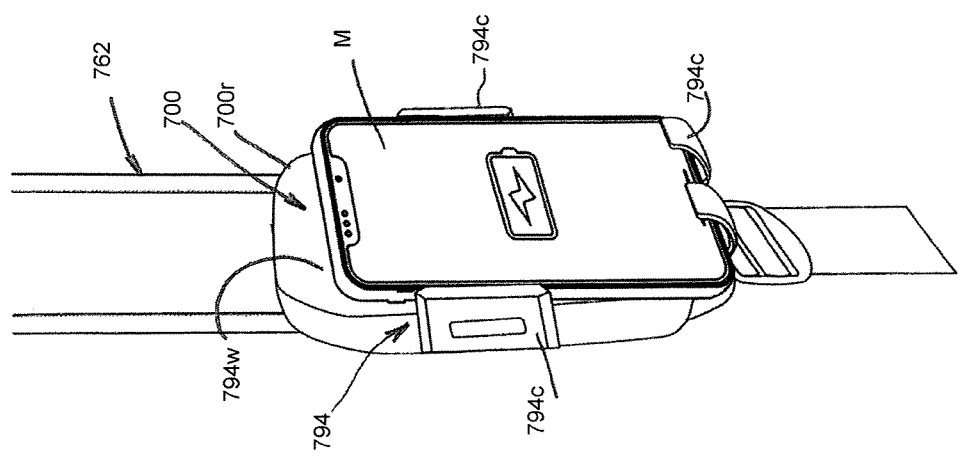
Figure 116A:
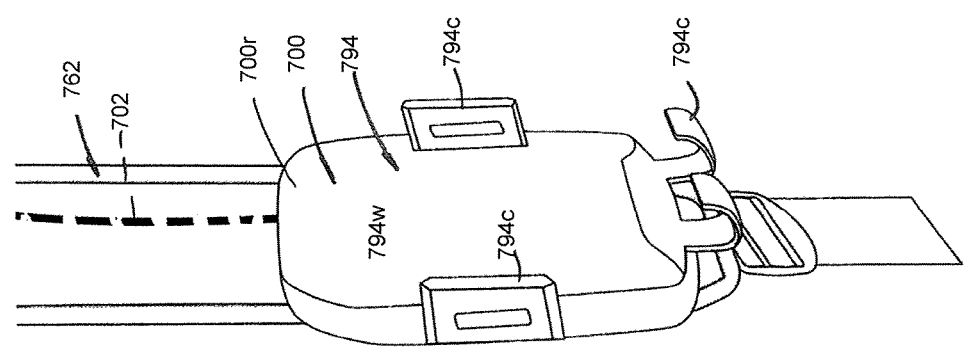
Figure 121:
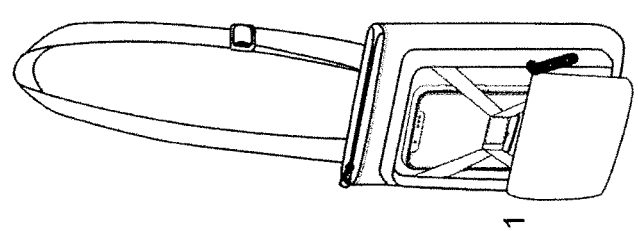
Figure 124:
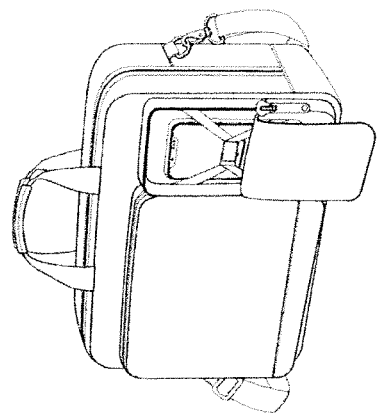
Figure 120:
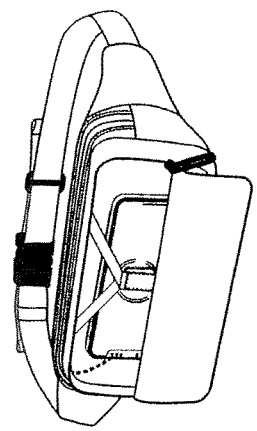
Figure 123:
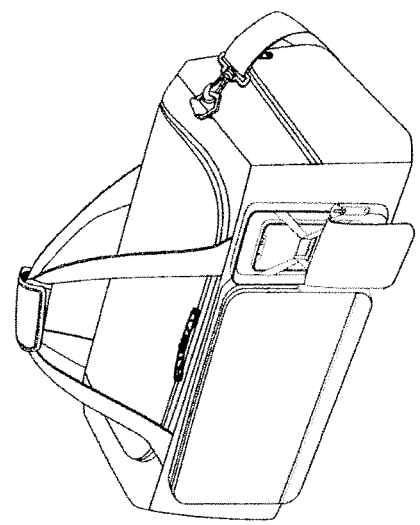
Figure 119:
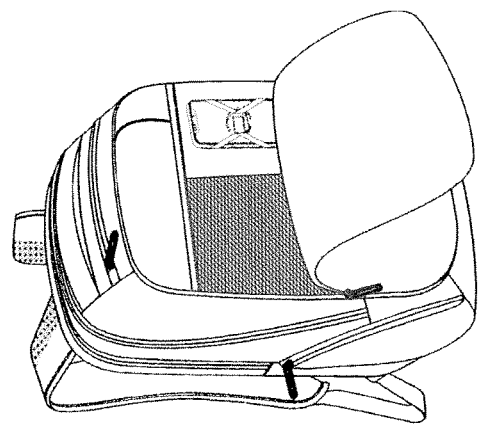
Figure 122:
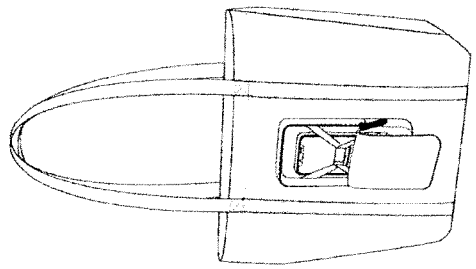

FIG. 116A illustrates an embodiment in which the holding component 792 of the raised portion 700r is replaced by a holding component 794 comprising a mobile phone holding device comprising a molded polymeric body including one or more retaining clips 794c that releasably engage and retain the mobile phone/device to be charged M in a position adjacent the wireless charging device 712 that is located in the raised portion 700r of the sheath 700 beneath a base wall 794w inside the internal space 764s of the strap 762. FIG. 116B corresponds to FIG. 116A but shows the associated mobile phone/device to be charged releasably engaged by the retaining clips 794c and retained in its operative charging position abutted with and adjacent the base wall 794w so as to be located adjacent the wireless charging device 712 carried by the strap 762. The base wall 794w lies between the wireless charging device 712 and the mobile device M to physically isolate and protect the wireless charging device 712 from the mobile device M while still allowing the wireless coupling and charging to occur.

FIGS. 117A & 117B correspond respectively to FIGS. 116A & 116B but shows that the mobile device holding component 794 can include at least first and second portions 794-1 and 794-2 that are connected and that are selectively movable relative to each other (i.e., at least one of the portions 794-1,794-2 is movable relative to the other such as in the up/down direction as shown) to selectively capture the associated mobile device M to be charged adjacent the base wall 794w near and aligned with and adjacent the charging device 712 that is connected to the strap 762 and located beneath/behind the base wall 794w. The first and second portions 794-1,794-2 can be moved away from each other to selectively release the mobile device M. The first and second portions 794-1,794-2 can be selectively located in a first position relative to each other to receive or release the associated mobile phone M (FIG. 117A) and can be selectively located in a second position relative to each other to retain or capture the mobile phone M for charging (FIG. 117B).

FIGS. 118A & 118B correspond respectively to FIGS. 117A & 117B but shows that the mobile device holding component 794 of the raised portion 700r of the sheath 700 can include at least first and second movable portions 794-1 and 794-2 that are connected to each other and/or to the base wall 794w and that are selectively movable laterally and/or or otherwise relative to each other and/or relative to the base wall 794w to selectively capture the mobile device M adjacent the base wall 794w near and aligned with and adjacent the charging device 712 that is connected to the strap 762 and located beneath/behind the base wall 794w. The first and second movable portions 794-1,794-2 can be moved laterally away from each other to selectively release the mobile device M. The first and second portions 794-1, 794-2 can be selectively located in a first position relative to each other to receive or release the associated mobile phone M (FIG. 118A) and can be selectively located in a second position relative to each other to retain or capture the mobile phone M for charging (FIG. 118B).

The specific embodiments above are only detailed explanation on the technical solutions of the disclosure, and the disclosure is not limited only by the embodiments above. Any improvement or replacement based on the principle of the utility model shall be within the protection scope defined in claims of the utility model.

The invention claimed is:

1. A convenient wireless charging cable system, comprising:
   a body with outer surfaces and inner surfaces, wherein the body comprises a shoulder strap for a backpack;
   a charging cable comprising a wireless charging end including a wireless charger and an input operative end, said charging cable at least partially located in the body between the inner surfaces;
   a raised portion located on one of the outer surfaces of the body;
   a power storage space in the body to hold an associated battery;
   a tunnel located between the inner surfaces of the body for the cable to extend through from a rear side of the raised portion to the power storage space;
   at least one exit of the tunnel for the input operative end of cable to extend out of the tunnel and extend to the power storage space;
   wherein the raised portion includes at least one holding component configured to secure an associated mobile device firmly to the raised portion;
   wherein the wireless charger is fixed by a fixing component to at least one of the inner surfaces of the body to secure the wireless charger firmly in an operative position adjacent the raised portion to improve a wireless charge coupling between the associated mobile device and the wireless charger;
   wherein the wireless charger is located within the tunnel inside the shoulder strap and the wireless charging cable system further comprises a second exit access opening located on one of the outer surfaces of the shoulder strap adjacent to the wireless charger to provide selective access to the tunnel to replace the wireless charging cable system, wherein a longitudinal axis of the second exit access opening is spaced from a longitudinal axis of the charging cable;
   and wherein the second exit access opening comprises a closure device selected from the group consisting of a fastener, zipper, snap, clip, clamp, magnetic fastener, button, hook and loop fastening element, strips, tape.

2. The convenient wireless charging cable system as set forth in claim 1, wherein the fixing component for the wireless charger is on the rear side of the raised portion adjacent one of the inner surfaces of the body.

3. The convenient wireless charging cable system as set forth in claim 1, the raised portion is made of elastic material to ensure the mobile device is held tightly enough to better communicate with the wireless charger.

4. The convenient wireless charging cable system as set forth in claim 1, wherein the wireless charger is fixed by said fixing component within an opening in said rear side of the raised portion.

5. The convenient wireless charging cable system as set forth in claim 1, wherein the fixing component is a tight pocket located between the inner surfaces of the body.

6. The convenient wireless charging cable system as set forth in claim 5, the tight pocket is made of elastic material to ensure the wireless charger is held tightly enough to better wirelessly couple with the associated mobile device.

7. The convenient wireless charging cable system as set forth in claim 1, wherein the fixing component comprises a hook and loop fastening element comprising a first fastening component fixed on one of the inner surfaces of the body and a second component fixed on the wireless charger.

8. The convenient wireless charging cable system as set forth in claim 1, wherein the fixing component comprises an elastic band.

9. The convenient wireless charging cable system as set forth in claim 1, further comprising a soft foam material located on a rear side of the shoulder strap to improve a user's comfort when carrying the backpack.

10. The convenient wireless charging cable system as in claim 1, wherein the holding component comprises one or more straps configured to receive and retain the associated mobile device.

11. The convenient wireless charging cable system as set forth in claim 10, wherein the one or more straps comprise elastic straps.

12. The convenient wireless charging cable system as set forth in claim 1, wherein the holding component comprises a pocket configured to receive and retain the associated mobile device.

13. The convenient wireless charging cable system as set forth in claim 12, wherein the pocket includes an opening for insertion and removal of the associated mobile device and, the wireless charging cable system further comprising a pocket closure device for selectively closing the pocket opening, the pocket closure device selected from the group consisting of a fastener, zipper, snap, clip, clamp, magnetic fastener, button, hook and loop fastening element, strips, tape.

14. The convenient wireless charging cable system as in claim 1, wherein the holding component is selected from the group consisting of an elastic band, a pair of bands with fasteners, magnet, clip, clamp.

15. The convenient wireless charging cable system as in claim 1, wherein the body comprises a right side shoulder strap of a backpack that includes both a left side shoulder strap and said right side shoulder strap, wherein said right side shoulder strap is spaced farther from a user's heart as compared to said left side shoulder strap when the backpack is worn to provide a distance of the wireless charger away from the user's heart.

16. The convenient wireless charging cable system as set forth in claim 1, wherein the raised portion has a base wall configured to physically isolate the associated mobile device from the wireless charger to protect the wireless charger.

17. The convenient wireless charging cable system as set forth in claim 1, wherein the raised portion is connected to a bottom portion that comprises fabric.

18. The convenient wireless charging cable system as set forth in claim 1, wherein the raised portion material is selected from the group consisting of fabric, film, plastic, metal, rubber, silicon.

\* \* \* \* \*